United States Patent
Richter et al.

(10) Patent No.: US 10,430,035 B2
(45) Date of Patent: Oct. 1, 2019

(54) EMBEDDED ANALYTICS FOR APPLICATIONS AND INTERFACES ACROSS MULTIPLE PLATFORMS

(71) Applicant: SAP SE, Walldorf (DE)

(72) Inventors: Kai Richter, Muehltal (DE); Emil Voutta, Heidelberg (DE); Anja Wipfler, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/685,751

(22) Filed: Aug. 24, 2017

(65) Prior Publication Data

US 2019/0065014 A1  Feb. 28, 2019

(51) Int. Cl.
| | | |
|---|---|---|
| G06F 3/0483 | (2013.01) | |
| G06F 8/38 | (2018.01) | |
| G06F 3/0484 | (2013.01) | |
| G06F 9/451 | (2018.01) | |
| G06T 11/60 | (2006.01) | |
| G06T 11/20 | (2006.01) | |

(52) U.S. Cl.
CPC ........ G06F 3/0483 (2013.01); G06F 3/04845 (2013.01); G06F 3/04847 (2013.01); G06F 8/38 (2013.01); G06F 9/451 (2018.02); G06T 11/206 (2013.01); G06T 11/60 (2013.01); G06T 2200/24 (2013.01)

(58) Field of Classification Search
CPC .......................................................... G06F 8/38
USPC .................. 715/752, 760, 764, 851, 853
See application file for complete search history.

(56) References Cited

U.S. PATENT DOCUMENTS

| | | | |
|---|---|---|---|
| 2004/0189717 A1 | 9/2004 | Conally et al. | |
| 2006/0224979 A1* | 10/2006 | Albrecht | G06F 8/38 |
| | | | 715/760 |
| 2009/0083058 A1* | 3/2009 | Beringer | G06Q 10/067 |
| | | | 705/348 |

(Continued)

FOREIGN PATENT DOCUMENTS

EP  2801894  11/2014

OTHER PUBLICATIONS

EP Extended European Search Report in European Appln. No. 18185686, dated Feb. 4, 2019, 11 pages.

*Primary Examiner* — Cao H Nguyen
(74) *Attorney, Agent, or Firm* — Fish & Richardson P.C.

(57) ABSTRACT

In one general aspect, a system and method are described for generating interactive graphics. The method may include obtaining a plurality of application data, the application data being associated with a role of a user and a plurality of applications, generating at least one tabular graphic representing a portion of the application data and at least one chart graphic representing the portion, the at least one tabular graphic and at least one chart graphic being interactive and selectable by a user, and generating and displaying a user interface, the user interface being based on the role of the user and including the at least one tabular graphic and the at least one chart graphic. In response to receiving a selection on a first filter location within the chart graphic, filtering the tabular graphic to display application data corresponding to the first filter location.

20 Claims, 29 Drawing Sheets

(56) References Cited

U.S. PATENT DOCUMENTS

| | | |
|---|---|---|
| 2009/0150773 A1 | 6/2009 | Falkner et al. |
| 2013/0218682 A1* | 8/2013 | Alterman ............... G06Q 10/00 705/14.58 |
| 2017/0131872 A1 | 5/2017 | Husain |

* cited by examiner

My Machine & Parts Distribution ⌄

Incoming Sales Orders
84
10 open web orders
2 unread mail
2 missed calls
1 voice mail
*122a*

Win Rate 62%

Quotation Pipeline
70038377  1,285.90 USD  Expires today
70038456  12,200.00 USD  Expires today
70012352  251.99 USD  Expires tomorrow  *122b*

Sales Order Fulfillment Issues
150
100
10
0
Q1 2014  Q2 2014  Q3 2014  *122h*

Customer Rating (Sentiment)
★★★★☆

*122c* Create Quote
*122e* Create Return

*122d* Create Sales Order
*122f* Create Account

Quick Links
My Sales Order (35)
My Accounts (160)
My Contacts (254)
Manage Returns
Materials ▼ 4 days
Order Processing (average)

Recent Contacts *122g*
Mike Jones
customer ✆ ✉
John Doe
customer ✆ ✉
Jane Smith
customer ✆ ✉

Recent Accounts
ABC Automotive
XYZ Enterprises, Inc.
LMN Motor Yachts
*122i*

*104*

Shell Toolbar *108*

Shell Main Container

| | | | | Q | ⊕ John Miller ⌄ |
|---|---|---|---|---|---|
| | Application Page HeaderBar | | | | |
| | | | | Public Profile | Take Action |

902

John Miller Senior UI Developer

⚫ Jmiller  Hi I'm John, I am passionate bout
+12345678  what I do and ill go the extra mile
xxxx@xxx.xxx  to make the customer win 🙂

Profile Completion ←— 906
[30%]

INFO  IN PROCESS  SHIPPED  LOREM IPSUM  NEW ORDERS  TEXT TAB TITLE

904

First Name:        Home Address:      Second Address:
John               Street             Street
Last name:         Town               Town
Miller             Mailing Address    Bibendum augue cursus
Lorem Ipsum dolor sit amet:  PO Box 123  Street
Etiam maecenas tempus  Town              Town

IN PROGRESS

Items

| | | | Search | Q | 🔲 |
|---|---|---|---|---|---|
| | | | | | ● |

| Product | Document Number | Supplier | Dimensions | Weight | Price | |
|---|---|---|---|---|---|---|
| Ultimate dynamic power projector 4713 | 10203040506070 8A | Supplier 1 | 51 x 42 18cm | 342 g | 15,00 EUR | ⌞ |
| Ultimate dynamic power projector 4713 | 10203040506070 8B | Supplier 2 | 51 x 42 18cm | 342 g | 15,00 EUR | ⌞ |
| Ultimate dynamic power projector 4713 | 10203040506070 8A | Supplier 3 | 51 x 42 18cm | 6587 g | 2,00 EUR | ⌞ |
| Ultimate dynamic power projector 4713 | 10203040506070 8A | Supplier 4 | 51 x 42 18cm | 4679g | 2,00 EUR | ⌞ |
| Ultimate dynamic power projector 4713 | 10203040506070 8E | Supplier 5 | 51 x 42 18cm | 999g | 10,00 EUR | ⌞ |
| Ultimate dynamic power projector 4713 | 10203040506070 8F | Supplier 2 | 51 x 42 18cm | 342g | 15,00 EUR | ⌞ |
| Ultimate dynamic power projector 4713 | 10203040506070 8G | Supplier 1 | 51 x 42 18cm | 342g | 15,00 EUR | ⌞ |
| Ultimate dynamic power projector 4713 | 10203040506070 8H | Supplier 3 | 51 x 42 18cm | 342g | 15,00 EUR | ⌞ |
| Ultimate dynamic power projector 4713 | 10203040506070 8H | Supplier 1 | 51 x 42 18cm | 342g | 15,00 EUR | ⌞ |

EMBEDDED ANALYTICS FOR APPLICATIONS AND INTERFACES ACROSS MULTIPLE PLATFORMS

TECHNICAL FIELD

This description generally relates to embedded analytics for applications and user interfaces. The description, in particular, relates to systems and techniques for generating and providing analytics between multiple software applications and user interfaces.

BACKGROUND

Traditionally, a separation has been placed between accessing analytic data and performing transactional work. This is, in part, due to a technical separation of live data, which is the subject of constant change, and analytic data, which is generally copied by a third party from the live data and implemented into reportable information. As a result, the availability of insightful analyses of live data streams for transactional work may be limited because the analyses may be based on outdated data.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect includes, a computer-implemented method for generating interactive graphics using at least one processor is described. The method may include obtaining a plurality of application data. The application data may be associated with a role of a user and a plurality of applications. The method may also include generating at least one tabular graphic representing a portion of the application data and at least one chart graphic representing the portion. The at least one tabular graphic and at least one chart graphic may be interactive and selectable by a user. The method may further include generating and displaying a user interface. The user interface may be based on the role of the user and may include the at least one tabular graphic and the at least one chart graphic. In response to receiving, from the user, a selection on a first filter location within the chart graphic, the method may include filtering the tabular graphic to display application data corresponding to the first filter location. The filtering may remove the data from the tabular graphic that does not correspond to the first filter location and may modify the chart graphic to display a portion of the chart representing data corresponding to the selection on the first filter location.

Other embodiments of this aspect may include corresponding computer systems, apparatus, and computer programs recorded on one or more computer storage devices, each configured to perform the actions of the methods.

Implementations may include one or more of the following features. The method as described above in which the at least one chart graphic includes a plurality of selectable filter locations within the chart graphic, and receiving a selection on a second filter location executes a filtering of the application data to update the user interface. The update may include generating additional interactive chart graphics, each representing different aspects of the portion of the application data.

The method as described above in which selecting one of the additional interactive chart graphics generates an update to each of the at least one chart graphic, the at least one tabular graphic, and the additional interactive chart graphics. The method as described above further including generating at least two key performance indicator tags corresponding to the tabular graphic, each key performance indicator tag representing a drill down of data associated with one or more additional interactive chart graphics. The method may also include generating, using the portion of the plurality of application data, a chart graphic corresponding to each key performance indicator tag and inserting the corresponding chart graphic in a reduced size within each key performance indicator tag. The inserted chart graphics may be minimized upon a cursor being removed from a corresponding key performance indicator tag and the inserted chart graphics may be enlarged upon the cursor being placed upon a corresponding key performance indicator tag. The method as described above further including combining the user interface, the additional interactive chart graphics, and the at least two key performance indicator tags into a webpage representing an analytical list page that is interactive and presenting the analytical list page to the user. The method as described above in which the at least one processor utilizes at least one service that represents an open protocol data service that accesses a plurality of data models and corresponding metadata to provide access to the user interface. The open protocol data service may define a communication protocol for accessing the user interface. The method as described above further including embedding the at least one chart graphic in a messaging application by inserting the at least one chart graphic into a message associated with the user. The method may also include embedding the at least one chart graphic into a tile on a homepage associated with the user. Implementations of the described techniques may include hardware, a method or process, or computer software on a computer-accessible medium.

In another general aspect, a system for generating embedded analytic data. The system may include at least one memory including instructions on a computing device and at least one processor on the computing device. The processor may be operably coupled to the at least one memory and arranged and configured to execute the instructions that, when executed, cause the processor to implement an analytic generation engine. The analytic generation engine is configured to obtain a plurality of application data and generate at least one tabular graphic representing a portion of the application data and at least one chart graphic representing the portion. The application data may be associated with a role of a user and a plurality of applications. The at least one tabular graphic and at least one chart graphic may be interactive and selectable by a user. The analytic generation engine may also be configured to generate and display a user interface. The user interface may be based on the role of the user and may include the at least one tabular graphic and the at least one chart graphic. In response to receiving, from the user, a selection on a first filter location within the chart graphic, the analytic generation engine may be configured to filter the tabular graphic to display application data corresponding to the first filter location. The filtering may remove data from the tabular graphic that does not correspond to the first filter location and modifying the chart graphic to display a portion of the chart representing data corresponding to the selection on the first filter location.

Other embodiments of this aspect may include corresponding computer systems, apparatus, and computer programs recorded on one or more computer storage devices, each configured to perform the actions of the methods.

Implementations may include one or more of the following features. The system as described above wherein the at least one chart graphic includes a plurality of selectable filter locations within the chart graphic, and wherein receiving a selection on a second filter location executes a filtering of the application data to update the user interface. The update may include generating additional interactive chart graphics, each representing different aspects of the portion of the application data. The system as described above wherein selecting one of the additional interactive chart graphics generates an update to each of the at least one chart graphic, the at least one tabular graphic, and the additional interactive chart graphics. The system as described above wherein the analytic generation engine is further configured to, generate at least two key performance indicator tags corresponding to the tabular graphic, each key performance indicator tag representing a drill down of data associated with one or more additional interactive chart graphics, generate, using the portion of the plurality of application data, a chart graphic corresponding to each key performance indicator tag, and insert the corresponding chart graphic in a reduced size within each key performance indicator tag. The inserted chart graphics may be minimized upon a cursor being removed from a corresponding key performance indicator tag, and the inserted chart graphics being enlarged upon the cursor being placed upon a corresponding key performance indicator tag.

The system as described above wherein the analytic generation engine is further configured to combine the user interface, the additional interactive chart graphics, and the at least two key performance indicator tags into a webpage representing an analytical list page that is interactive and present the analytical list page to the user.

The system as described above wherein the at least one processor utilizes at least one service that represents an open protocol data service that accesses a plurality of data models and corresponding metadata to provide access to the user interface and the open protocol data service defines a communication protocol for accessing the user interface. The system as described above wherein the analytic generation engine is further configured to embed the at least one chart graphic into a tile on a homepage associated with the user.

In another general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. In one general aspect, a computer program product that is tangibly embodied on a non-transitory computer-readable storage medium and includes instructions that, when executed by at least one computing device, are configured to cause the at least one computing device to obtain a plurality of application data, the application data being associated with a role of a user and a plurality of applications, generate at least one tabular graphic representing a portion of the application data and at least one chart graphic representing the portion, the at least one tabular graphic and at least one chart graphic being interactive and selectable by a user, and generate and display a user interface, the user interface being based on the role of the user and including the at least one tabular graphic and the at least one chart graphic. In response to receiving, from the user, a selection on a first filter location within the chart graphic, the instructions may filter the tabular graphic to display application data corresponding to the first filter location, the filtering removing data from the tabular graphic that does not correspond to the first filter location and modifying the chart graphic to display a portion of the chart representing data corresponding to the selection on the first filter location.

Other embodiments of this aspect include corresponding computer systems, apparatus, and computer programs recorded on one or more computer storage devices, each configured to perform the actions of the methods.

Implementations may include one or more of the following features. The computer program product where the at least one chart graphic includes a plurality of selectable filter locations within the chart graphic, and where receiving a selection on a second filter location executes a filtering of the application data to update the user interface, the update including generating additional interactive chart graphics, each representing different aspects of the portion of the application data. The computer program product where the at least one computing device is further configured to generate at least two key performance indicator tags corresponding to the tabular graphic, each key performance indicator tag representing a drill down of data associated with one or more additional interactive chart graphics, generate, using the portion of the plurality of application data, a chart graphic corresponding to each key performance indicator tag; and insert the corresponding chart graphic in a reduced size within each key performance indicator tag, the inserted chart graphics being minimized upon a cursor being removed from a corresponding key performance indicator tag, and the inserted chart graphics being enlarged upon the cursor being placed upon a corresponding key performance indicator tag.

The computer program product where the at least one computing device is further configured to utilize at least one service that represents an open protocol data service that accesses a plurality of data models and corresponding metadata to provide access to the user interface, where the open protocol data service defines a communication protocol for accessing the user interface. The computer program product where the at least one computing device is further configured to embed the at least one chart graphic in a messaging application by inserting the at least one chart graphic into a message associated with the user. Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

FIG. 1D is an illustration showing an example active application screen (an overview page) displayed in a shell main container.

FIGS. 9A-9C are screenshots depicting example embedded analytics.

FIG. 11 is a screenshot depicting example embedded analytics within a messaging application.

Like reference symbols in the various drawings indicate like elements.

DETAILED DESCRIPTION

Figure 1A:
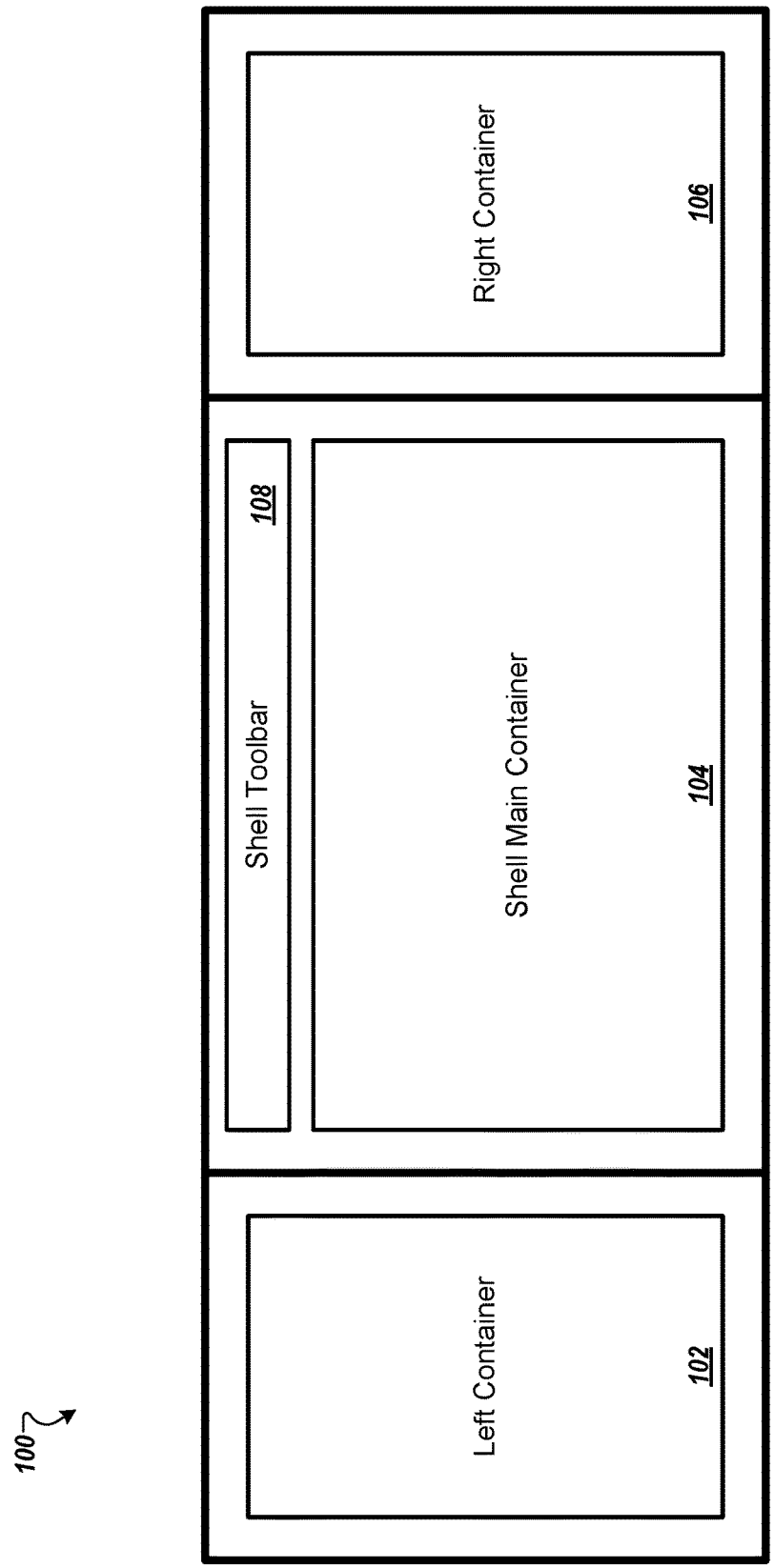
FIG. 1A is an illustration of a user interface entry point (a viewport) for a particular user experience.

The systems and methods described herein may be configured to generate an experience that seamlessly integrates analytics (e.g., analytical data) into transactional applications. In general, analytics may refer to data, graphics, metrics, calculations, and/or other processed/analyzed data that can be provided in a user interface to enable display of analytical information alongside transactional information.

The systems and methods described herein can provide users with an ability to generate and embed reports and analyses, data visualizations, and key figures or dashboards from a variety of data sources into any number of applications. For example, SAP FIORI embedded analytics may provide a user experience that fully integrates analytics into the transactional context of the user in a way that is simple enough to be understood, and also detailed and powerful enough to be accepted and trusted by the user.

Embedded analytics may be inserted into user interfaces in a way that provides a visual filtering for the user. For example, a user can select a portion of a pie chart to filter the data in the chart and view a drill down of the selected portion. This can provide a convenient way to reduce steps to shrink datasets while providing content visualization based on transactional content, and a comprehensive view of transactional content within transactional applications. In some implementations, embedded analytics may provide a visual perception of graphical data to improve particular user recognition of facts and situations captured by the data. For example, if transactional data pertaining to a sales order can be presented with a similar graphic for any number of products, the user can begin to visually understand how each product compares to each other peer product. This can provide insight and transparency into the data by accessing live (e.g., line-item) data and generating graphics that correlate such data.

In some implementations, embedded analytics can be used within user interface (UI) elements of a particular user experience (UX) such as an SAP Fiori® UX. In some implementations, particular analytical information may be embedded within transactional application software based on a context (e.g., contextual insight) associated with a user accessing transactional software. For example, the context may pertain to a role associated with the user, an action being taken by the user, applications open by the user, and/or specific access or location within the transactional software.

Embedding analytical information into a transactional application can enable the user to interact with visual data representations to view aggregated data while maintaining direct access to transactional content. This can provide an advantage of allowing the user to continue processing and/or managing business objects and tasks while interacting with aggregated data. In some implementations, the embedded analytics may include any number of visual filters and chart drill downs that can be used to reduce a particular dataset into smaller collections of objects. Such analytics can be generated for the user without requiring the user to perform trial and error filtering based on conventional searching of value help.

A user may embed/integrate analytical content into an application in various approaches. A first approach is a pin to approach in which a user can select a key performance indicator (KPI) from a detail screen and pin a representative view and/or direct link to other applications. A second approach is for a user to choose which defined areas in a floorplan are to be embedded by using analytical content blocks. The selection can be done via browsing through a repository of available KPIs.

In some implementations, the systems and methods described herein may provide insight as a summarized graphic. Such a graphic can enable a user to quickly determine which actions to carry out and can provide selectable actions within or around the summarized graphic. The systems described herein can generate summarized graphics at runtime, which may provide the advantage of enabling immediate response to unplanned or systematic changes in a particular business and to appropriately prioritize (or reprioritize) tasks instead of working on a queue of transactions.

In order to achieve this goal, KPIs, analysis, results, and analytical applications can be provided to a user in a convenient way (e.g. on a home page, via active updates pushed to the UI, via chat or email, etc.). In addition, any action that may be carried out can be provided via links or a context menu. Provision of actions in such a manner may be referred to as "insight-to-action," which can enable a seamless UI navigation from analytics to the relevant business transactions in real-time in order to show an immediate effect of an action.

In some implementations, enabling a seamless UI may indicate that either analytics are built into task-oriented apps, or that the analytics can be reached via context-sensitive navigation with one or more clicks. In general, the embedded analytics are generated to be consistent across the same analytical consumption pattern (e.g. a list report, a drill down chart) and the same visualization and interaction model may be provided in all applications. Furthermore, end-to-end consistency is provided to display the exact same (and correct) values for semantically the same data in different apps (e.g., in real time).

The systems and methods described herein can provide real-time analytical information to enable users to define key performance indicators directly on SAP HANA views and to expose such KPIs as KPI tiles for the user's homepage. In addition, KPI tiles can be provided in analytical applications with predefined drill down paths and visualizations to allow the user to explore details of the underlying data and take action. In some implementations, users can create their own variants of the particular applications by changing filter criteria. In some implementations, users can create their own variant of an application by selecting different visualizations and saving the visualizations as a new tile to a home page associated with a particular user.

The systems and methods described herein can provide services to analytical data to enable analytical tiles. The services can ensure that the home page associated with a particular user may become a user-defined dashboard displaying user-relevant information and key figures. In short, the systems and methods described herein can enable such user-defined tiles/applications to be integrated into the application environment. This means that applications (and embedded analytics) can be assigned to end users in the same way as transactional applications are assigned to users. Furthermore, navigation between apps may be carried out in a similar fashion to navigation between transactional applications (as described in detail below).

In addition, the systems and methods described herein can use intent-based navigation. This includes transferring particular contexts between analytical applications and transactional applications, to allow the user to take action based on the insights gathered with respect to the contexts. Such transferring of data and contexts ensures that a separation between the analytical and the transactional worlds is maintained while the data is shared for purposes of capturing and embedding analytical data within the transactional application(s). Embedding analytical information into the transactional flow of the user—and integrating the KPIs into an environment where the KPIs are actually influenced and created—can provide the advantage to users of displaying immediate insight into the effect of user actions.

The systems and methods described herein can use analytical applications and transactional applications together to provide role-based, real time information about operations carried out by enterprise transactional applications. To facilitate such applications, the architecture described in this disclosure can enable developers and end users to utilize Open Data Protocol (OData) services and techniques. Such services can employ a gateway to provide a way to connect devices, environments, and platforms to enterprise software based on market standards. The gateway may represent an architecture layer between a client (e.g., device, framework, etc.) and the provided applications described herein. The gateway can enable the development of UIs for use in different environments (e.g., social and collaboration environments). The gateway can also enable the development of UIs for use on different types of client computing devices.

In some implementations, the architecture described herein can employ OData services to execute applications in a scalable and cost-efficient manner in a cloud computing environment by following protocols defined in the OData services. In general, the architecture described herein may employ SAP.UI5 with OData services to build user interfaces (UIs) for a simplified user experience (UX) across digital assets defined in applications and interfaces across multiple platforms (e.g., UI technologies such as HTML5/SAP.UI5, WebDynPro, WebGUI, and SAPGUI, etc.). Among other things, aspects of an embedded analytics environment may leverage elements of one or more of an analytical engine, OData and optionally various OData extensions or enhancements, as well as elements of SAP HANA, as will be described in further detail below.

In operation, OData services may define a common access layer for consuming application data. In general, an OData service can be defined by a lifecycle of the service and can include activation of the OData service, maintenance of the OData service, maintenance of models and services (up to and including clean up of the metadata cache) associated with the OData service, employing RESTful applications to use HTTP requests to post, create, update, read, and/or delete data, and to employ REST techniques for web services to use HTTP for create, read, update, and/or delete operations, as described in more detail below.

Enterprise transactional applications can evolve from large monolithic on-premise software deployments into multiple (e.g., hundreds of, thousands of) small, componentized applications that can execute (run) on various types of computing devices and network platforms. For example, the fifth version of Hypertext Markup Language (HTML5) can be used as a basis for structuring and presenting an application platform that includes a grid matrix-style home screen or dashboard-like user interface. The use of HTML5 can provide an improved user experience, can reduce a user interface complexity, and may increase user productivity across multiple types of computing devices. The computing devices can include, but are not limited to, desktop computers and mobile computing devices such as laptop computers, tablet computers, notebook computers, personal digital assistants (PDAs), smartphones, mobile phones, smart watches, etc.).

In some cases, the grid matrix-style home screen or dashboard-like user interface allows a user to open and access a selected application. In some cases, the grid matrix-style home screen or dashboard-like user interface allows a user to access content within an application. These user interfaces can present user experience (UX) and user interface (UI) shortcomings while attempting to provide optimized usability and user-centric business functionalities related to transactional tasks.

For example, users may need to navigate back and forth between multiple screens that can include home screens, application instances, and drill downs, in order to perform various transactional tasks to make viable business decisions. The user may need to navigate back and forth between multiple screens when viewing related data between various applications.

Enterprise applications that are associated with transactional workflows in an enterprise can be implemented using a software development technology or foundation (e.g., HTML5/CSS/JS technology) in a particular UI framework (e.g., SAPUI5) in order to provide a beneficial UX and UI. The enterprise applications can be implemented to execute or run on multiple different types of computing devices such as desktop computers and mobile computing devices (e.g., laptop computers, tablet computers, notebook computers, personal digital assistants (PDAs), smartphones, mobile phones, smart watches, etc.).

For example, the UI may use elements of a particular UX (e.g., an SAP Fiori® UX) to provide a user with a personalized, responsive, seamless, and simple user experience across enterprise applications (including legacy and new), across different types of computing devices such as desktop computers and mobile computing devices (e.g., laptop computers, tablet computers, notebook computers, personal digital assistants (PDAs), smartphones, mobile phones, smart watches, etc.), and across all possible deployment options (e.g., on-premise, cloud, as-a-service, etc.).

The particular UX can deploy an array of interactive features and process tools that can be integrated with a suite or set of enterprise applications that have specific functionalities. The particular UX can provide intelligent, contextual-based support for users across an enterprise. The particular UX can use a "push" model that can anticipate tasks (e.g., transactional tasks) for a user based on a role of the user in the enterprise. The particular UX can import real-time data that can be tailored to specific tasks. The software for the UI for the particular UX can be implemented to easily and transparently scale the UI accordingly for display on each display device included in each of the different possible computing devices that can execute (run) the enterprise applications.

FIG. 1A is an illustration of a UI entry point (a viewport 100) for a particular UX. The viewport 100 can be a single-screen view partitioned into multiple (e.g., three) multifunctional screen areas (e.g., a left screen area (left container 102, a center screen area (shell main container 104), and a right screen area (right container 106) for display in a display area (on a display device) included in a computing device. The viewport 100 can include a shell toolbar 108. The shell toolbar 108 can include a global search and other services, which are available to a user across all enterprise applications.

The shell main container 104 can display information for use as a main workspace for the UX. In some implementations, multiple different screens can be displayed in the shell main container 104. For example, a login screen, a launchpad screen, and an overview page can alternatively be displayed in the shell main container 104. The viewport 100 can provide a user with a screen orientation that can allow the user access to application information. The viewport 100 can provide the user with a UX and UI that includes the business functionalities and enterprise application-to-application navigations needed by the user without disrupting a context of a current task of the user.

Figure 1B:
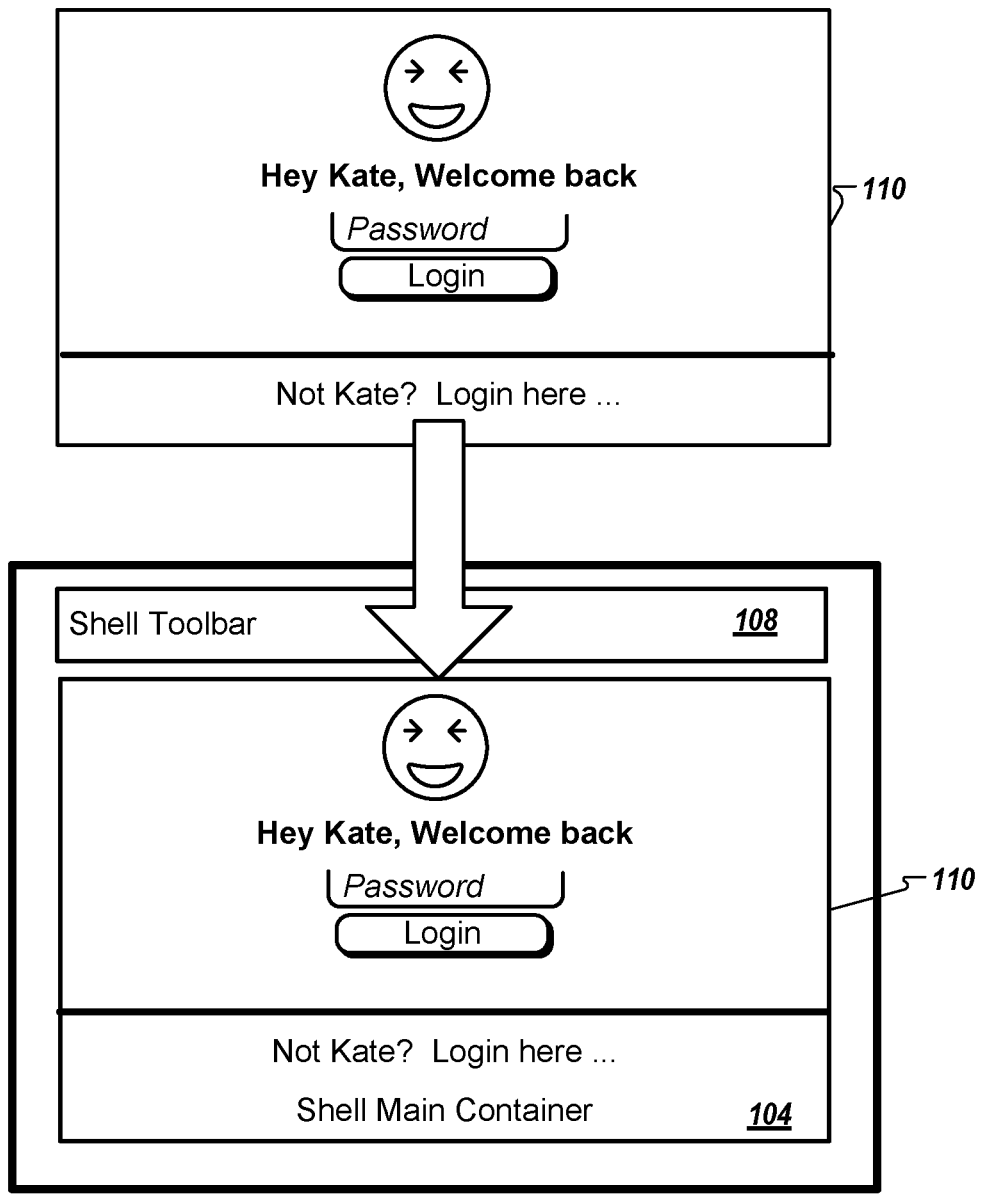
FIG. 1B is an illustration showing an example login screen displayed in a shell main container.

FIG. 1B is an illustration showing an example login screen 110 displayed in the shell main container 104. The login screen 110 provides a UI that allows a user to enter credentials in order to log into and begin a personalized and customized UX. In the example shown in FIG. 1B, the login screen 110 appears to drop into the shell main container 104 from a virtual extension area located along a top of a display area. In some implementations, the virtual extension area can be placed along the bottom of the display area. In some implementations, the virtual extension area can be placed to the left and/or the right of the display area.

Figure 1C:
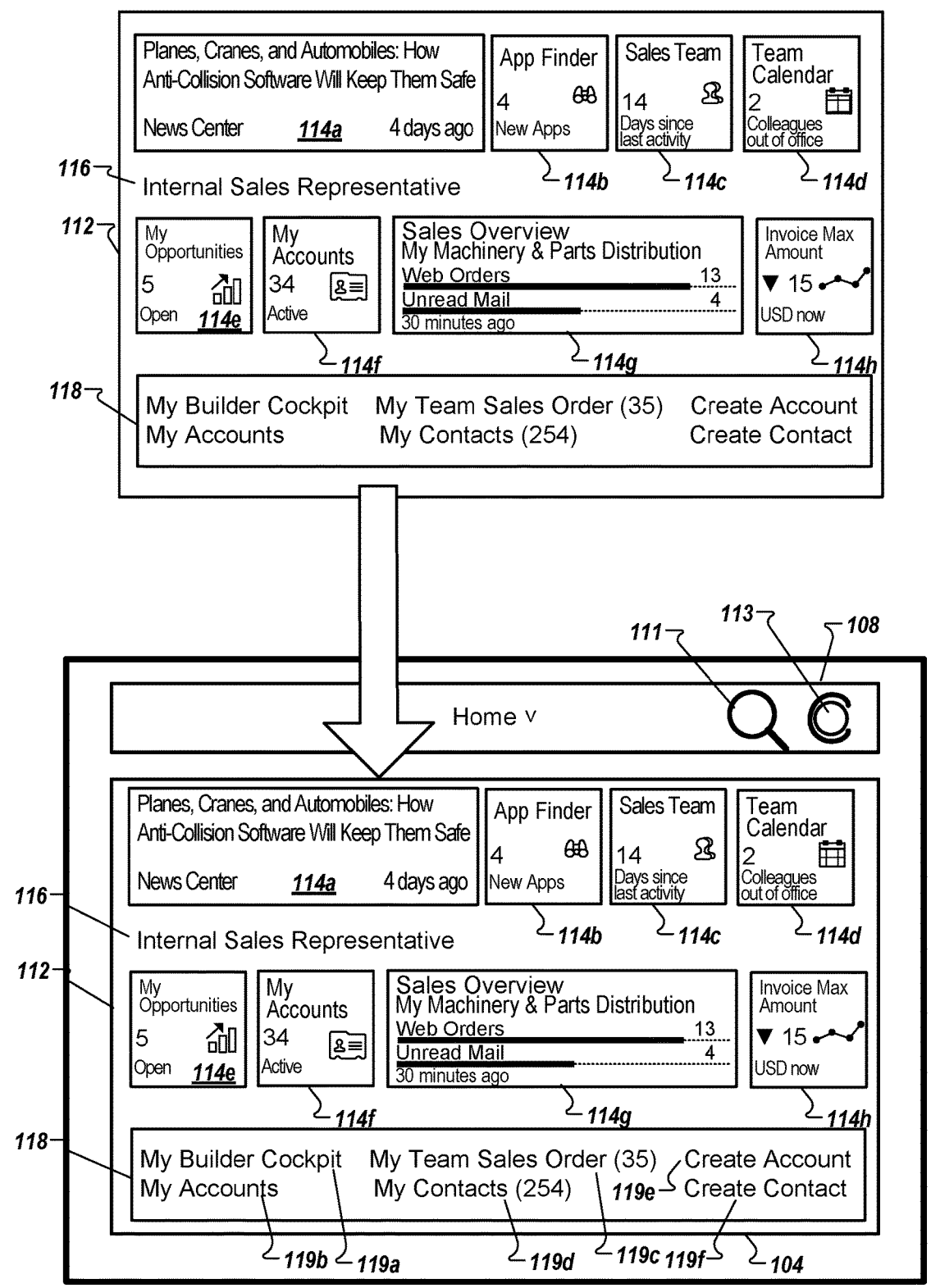
FIG. 1C is an illustration showing an example launchpad displayed in a shell main container.

FIG. 1C is an illustration showing an example launchpad 112 displayed in the shell main container 104. The launchpad 112 can be a web-based entry point (or homepage) for enterprise applications that can execute (run) across multiple platforms and computing devices. In the example shown in FIG. 1C, the launchpad 112 appears to drop into the shell main container 104 from the top of a display area. In some implementations, the virtual extension area can be placed along the bottom of the display area. In some implementations, the virtual extension area can be placed to the left and/or the right of the display area.

The launchpad 112 can serve as a bracket around (or a base for) a set (or group) of enterprise applications, providing a single point of entry for the set of enterprise applications. In the example shown in FIG. 1C, the launchpad 112 presents (displays on a screen of a computing device of a user) each application represented by a tile. A tile can be a container that represents the application. Each tile can display different types of content. A user can interact with each tile to navigate to the specific enterprise application associated with the tile. In addition, when designing a tile to represent a specific application, a programmer can assign a tile to a specific user or group of users. The launchpad 112 can provide one or more services. The one or more services can include, but are not limited to, application-to-application navigation, personalization, role-based application assignments, search, and incident creation.

The launchpad 112 can be a role based, personalized, real-time and contextual aggregation point for business applications and analytics. The launchpad 112 can run (execute) on multiple computing devices including, but not limited to, desktop computers and mobile computing devices such as laptop computers, tablet computers, notebook computers, personal digital assistants (PDAs), smartphones, mobile phones, smart watches, etc.). In addition, the launchpad 112 can be deployed on multiple platforms (e.g., Linux, Windows, Windows Phone, MAC®, iOS®, OS X®, Android®, etc.).

The launchpad 112 includes tiles 114*a-h*. Each tile can display different types of content. For example, tile 114*a* can be a news and feeds tile that can enhance collaboration by providing a user with information about the enterprise. The tiles 114*a-h* can be individually color-coded. A color can represent a particular role (e.g., finance, human resources, supply chain management (SCM), customer relationship management (CRM), etc.). The tiles 114*a-h* can be associated with a group 116. Tile 114*f* can be a key performance indicator (KPI) tile. Tile 114*b* can be a basic launch tile. Tile 114*d* can be a monitoring tile. Tile 114*g* can display a comparison chart for specific content.

The launchpad 112 includes a link list area 118 that includes links 119*a-f*. The link list area 118 is an area on the launchpad 112 that can provide links to enterprise applications represented by the tiles 114*a-h*. For example, a user can select and drag a tile from the tile area on the launchpad 112 into the link list area 118 to create a link to the application associated with (represented by) the tile. In some implementations, the launchpad 112 can include a footer toolbar (e.g., footer toolbar 132 as shown in FIG. 1F). In some implementations, the footer toolbar can appear to float over the content displayed in the launchpad 112.

In some implementations, the shell toolbar 108 can display a search icon 111 and a copilot launch icon 113. A user can select (click on) the copilot launch icon 113 to launch a copilot UI. A copilot UI will be described in more detail with reference to FIG. 1I.

FIG. 1D is an illustration showing an example active application screen (overview page 120) displayed in the shell main container 104. The enterprise applications that can be accessed by a user by way of the launchpad 112 and then subsequently displayed in an active application screen (e.g., the overview page 120) can include, but are not limited to, transactional applications, analytical applications, and fact sheet applications (contextual navigation applications). Transactional applications can allow a user to create, change and/or approve processes with guided navigation. Analytical applications can provide a user with a visual overview of a dedicated topic for monitoring and tracking purposes to allow for further key performance indicator (KPI) related analysis. Fact sheet applications can allow a user to view essential information about an object and to allow navigation between related objects.

The overview page 120 can visualize all of the information a user may need for a specific business context (business domain) on a single page or screen. The information can be displayed in one or more variable content packages (VCPs) or cards 122a-i. Each card can be a container of content for organizing large amounts of information on an equal plane within the overview page 120. In some implementations, a user can rearrange the position of the cards 122a-i on the overview page 120. In some implementations, a user can define, add, or delete cards included in the overview page 120.

An overview page (e.g., the overview page 120) can be a selectable application (e.g., from the launchpad 112) providing an integrated gateway into enterprise applications and application content included in the launchpad 112. The UI of the overview page (e.g., the overview page 120) can provide a user with a visual summary of data, links, actions, and content that are relevant to a business domain of expertise of a user and relevant to a selected role of the user within the domain. The visual summary can be presented in one or more cards (e.g., the cards 122a-i) that display live content to a user at-a-glance without the user having to open multiple applications and perform multiple drill downs through application content to find and present the content.

In some implementations, the overview page 120 can include a footer toolbar (e.g., footer toolbar 132 as shown in FIG. 1F). In some implementations, the footer toolbar can appear to float over the content displayed in the overview page 120.

In some implementations, an enterprise system can determine content displayed on an overview page (e.g., the overview page 120). In addition or in the alternative, a selection of one or more business domains and one or more roles of a user in the business or enterprise can determine content displayed on an overview page (e.g., the overview page 120). In some implementations, a user can make the selection using a settings UI included in a launchpad (e.g., the launchpad 112). In some implementations, a user can select one or more business domains and/or one or more roles of the user in the enterprise by way of an overview page (e.g., the overview page 120). Selecting one or more business domains and/or one or more roles of the user in the enterprise by way of the overview page can maintain absolute relevance to the individual user and the way in which the user works.

In some implementations, the user can personalize the layout and placement of one or more cards (e.g., the cards 122a-i) included in a UI of an overview page (e.g., the overview page 120) and the display of content included in each card. The personalization can enhance the workplace productivity of the user.

Figure 1E:
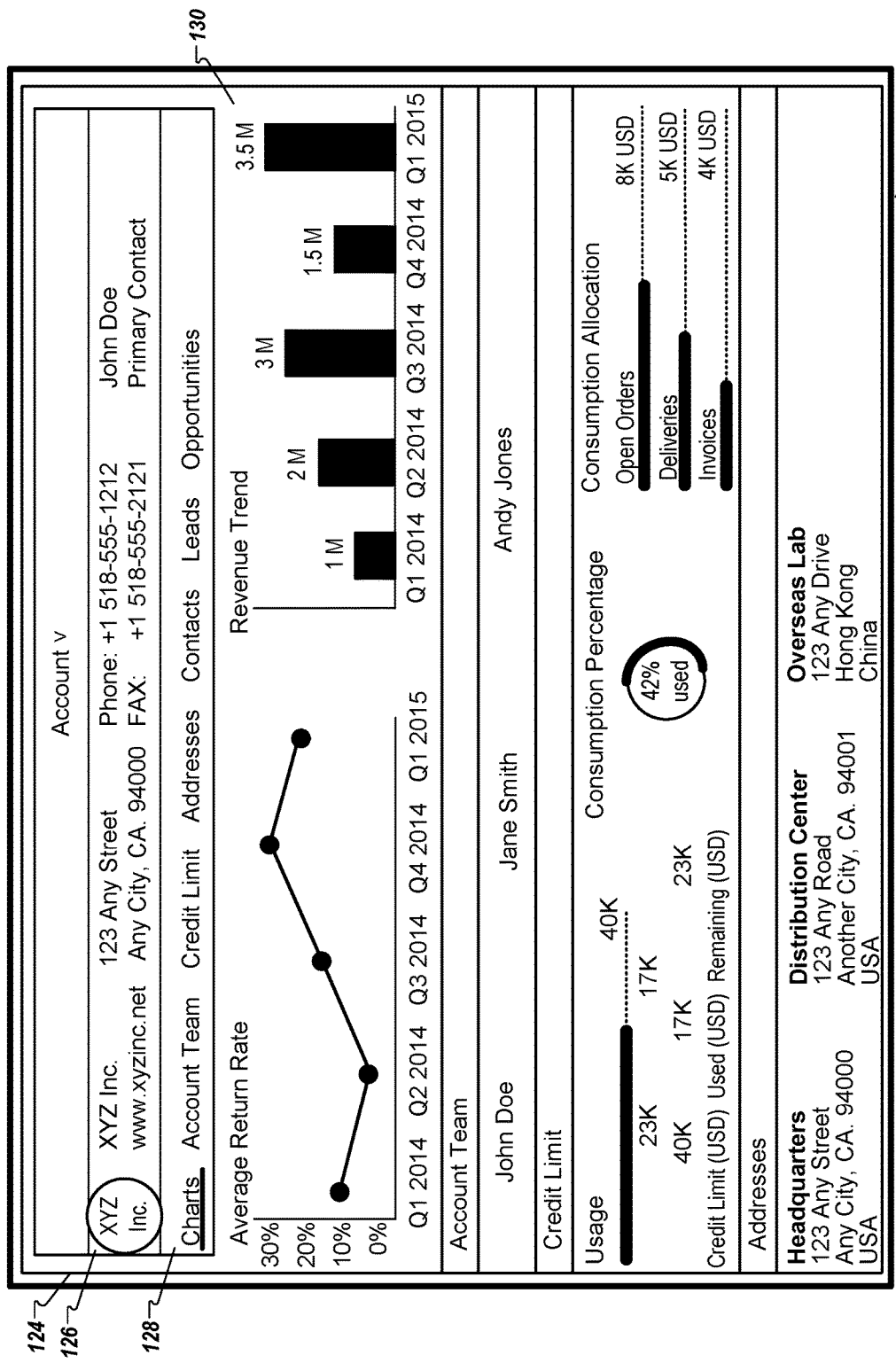
FIG. 1E is an illustration showing an example object page displayed in a shell main container.
Figure 1F:
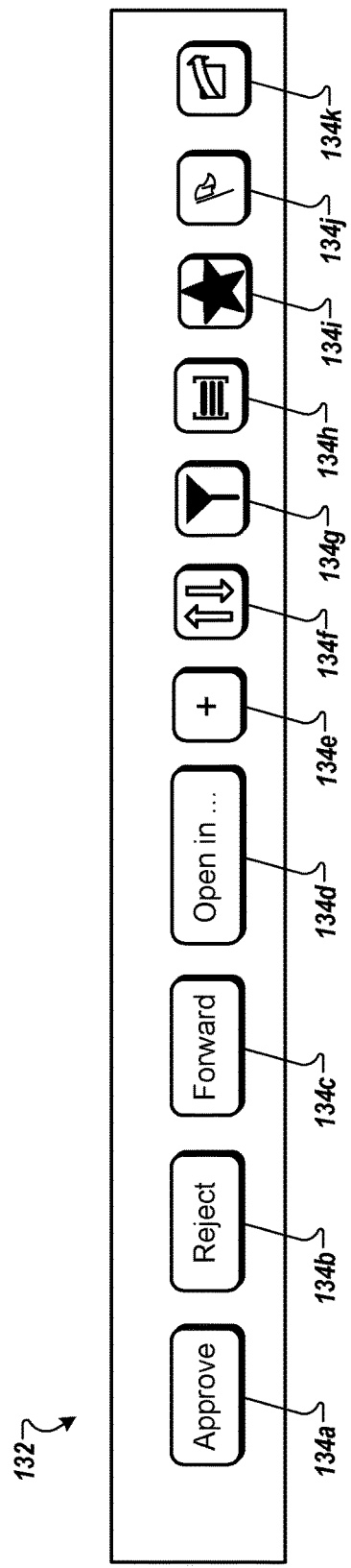
FIG. 1F is an illustration showing an example footer toolbar.

FIG. 1E is an illustration showing an example object page (object page 124) displayed in the shell main container 104. An object page can be a floor-plan used to represent objects in a UI. An object page can be used to display, create, or edit an object. An object can represent a business entity (e.g., a customer, a sales order, a product, an account, etc.). Enterprise applications that reflect a specific scenario (e.g., a sales order, am account status) can be bundled using an object. The object page can include a header area 126, a navigation area 128, a content area 130, and, in some implementations, a footer toolbar (e.g., footer toolbar 132 as shown in FIG. 1F). In some implementations, the footer toolbar can appear to float over the content displayed in the object page 124. For example, referring to FIG. 1C, a user can select the tile 114f and an object page can be displayed to the user.

FIG. 1F is an illustration showing an example a footer toolbar (e.g., footer toolbar 132). In some implementations, referring to FIG. 1A, the footer toolbar 132 can appear at the bottom of a screen displayed in the shell main container 104, the left container 102, and/or the right container 106. For example, as described herein with reference to FIGS. 1C-E, a footer toolbar (e.g., the footer toolbar 132) can be displayed at the bottom of the launchpad 112, the overview page 120, and the object page 124. The footer toolbar (e.g., the footer toolbar 132) can continue to appear at the bottom of the screen of the display area of the display device even as the displayed screen is scrolled. The footer toolbar (e.g., the footer toolbar 132) can appear to hover over or float over the content being displayed on the screen. The footer toolbar 132 can include buttons or controls 134a-k. The controls 134a-k can be selected by a user in order to perform one or more actions that can affect content included on the page being displayed on the screen. The controls 134a-k are examples of controls that can be included in a footer toolbar. In some implementations, the controls can be different, fewer than, or more than the controls 134a-k. The type and number of controls included in a footer toolbar can be based on the type of page being displayed and/or the content being displayed in the page.

Figure 1G:
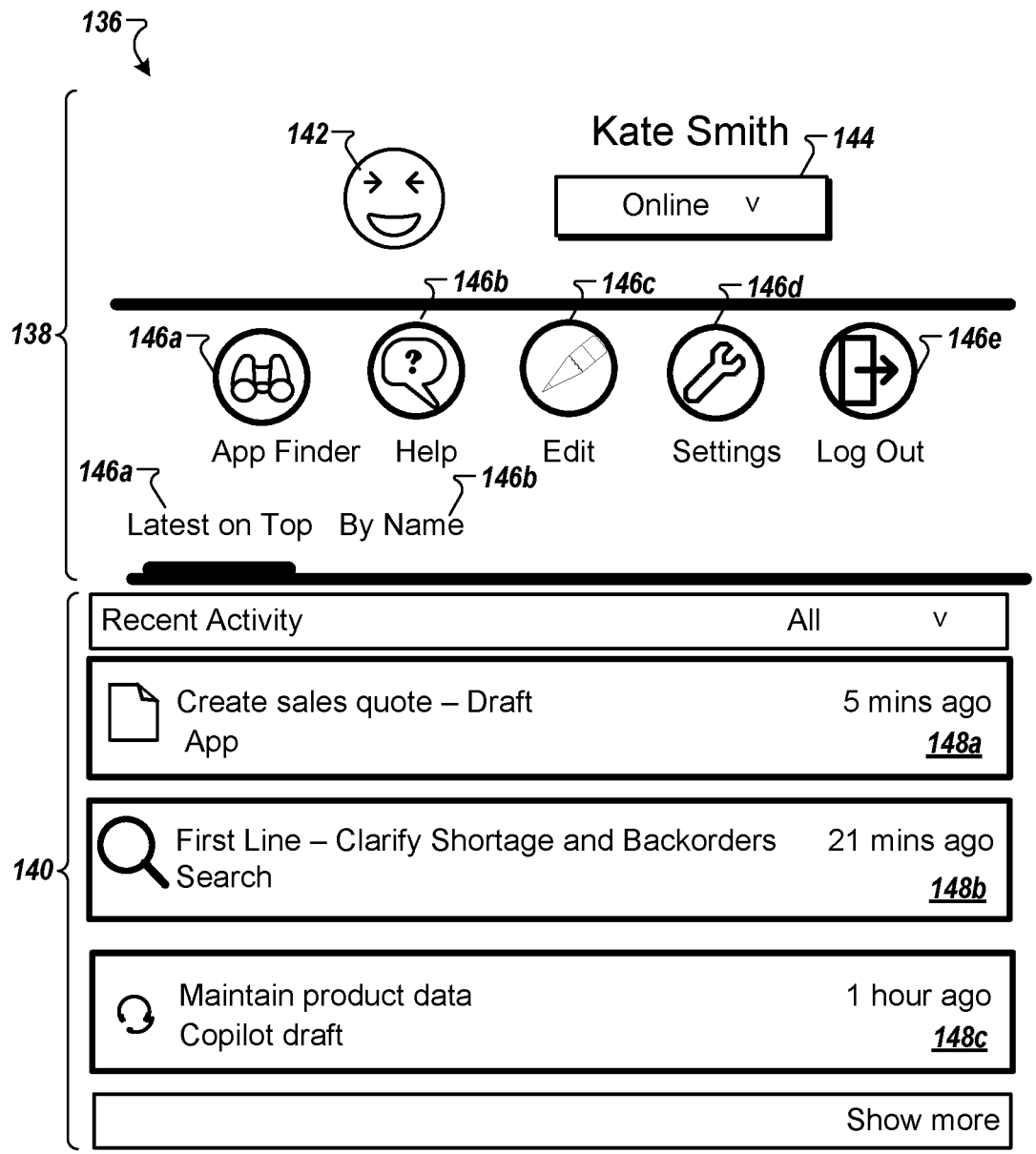
FIG. 1G is an illustration showing an example me area that can be displayed in a left container.

FIG. 1G is an illustration showing an example me area (e.g., me area 136) that can be displayed in the left container 102. In some implementations, the me area 136 can be displayed in the right container 106. The me area 136 includes an upper section 138 and a lower section 140. The upper section 138 includes a user icon 142. Selecting (clicking on) the user icon 142 can provide a user profile. A dropdown indicator button 144 displays a status of the user and, if selected, a user can logout of an application. The upper section 138 includes navigation targets 146a-e. Selection of (clicking on) a navigation target by a user triggers a corresponding functionality (e.g., an application) associated with a navigation target. The me area 136 can provide various generalized functionalities as they are related to a user.

The upper section 138 can include sort selections 146a-b. A user can select (click on) a sort selection (e.g., one of the sort selections 146a-b) to determine how the listing of the recent activities included in the lower section 140 will be sorted and displayed.

The lower section 140 of the me area 136 includes a list of recent activities 148a-c. The recent activities 148a-c can include links 156a-c, respectively, that when selected (clicked on) by a user can navigate the user to back to the shell main container 104, opening an application (or function) that corresponds to the link in the shell main container 104. Recent activity items can include, but are not limited to, enterprise applications, triggered searches, co-pilot collections, and co-pilot drafts.

Figure 1H:
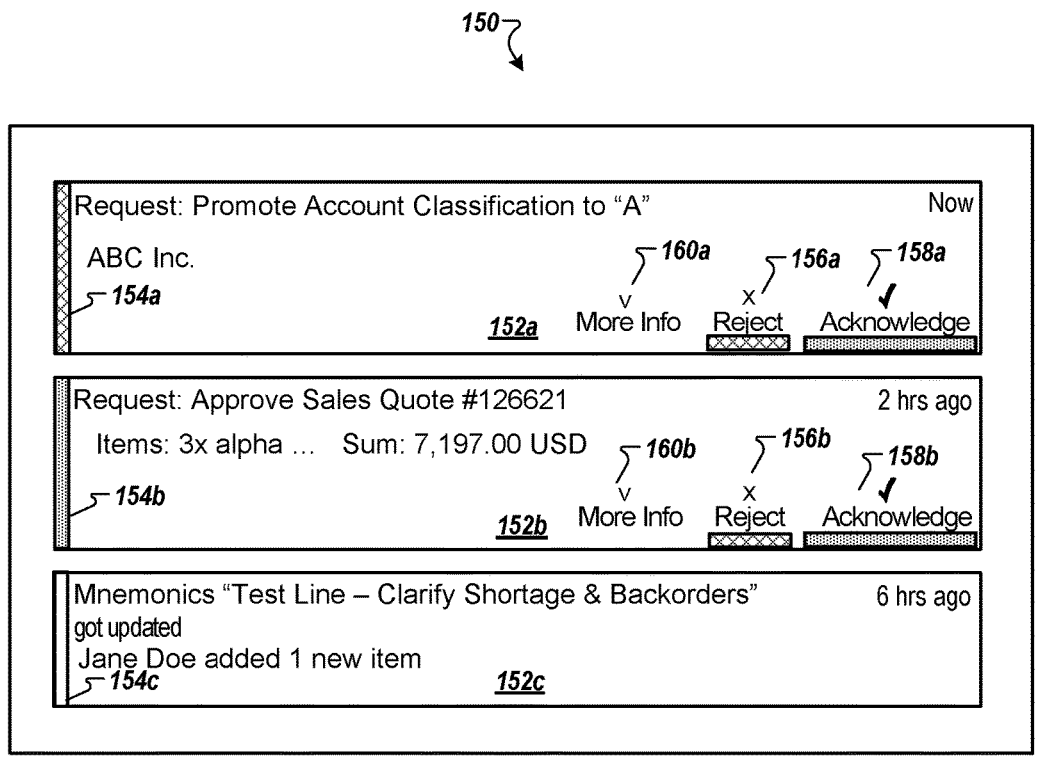
FIG. 1H is an illustration showing an example notification area that can be displayed in a right container.

FIG. 1H is an illustration showing an example notification area (e.g., notification area 150) that can be displayed in the right container 106. In some implementations, the notification area 150 can be displayed in the left container 102. The notification area 150 includes notifications 152 a-c. A user interacting with the UI in the notification area 150 can take immediate action on a notification. A notification item (e.g., notifications 152 *a-c*) can have an indicator (e.g., notification indicators 154*a-c*) that can indicate the status of the notification. For example, a notification indicator can be color coded to indicate a particular status of the notification.

A user can reject a notification by selecting (clicking on) a reject selection (e.g., a reject selection 156*a-b*). For example, a user can reject the notification 152*a* by selecting (clicking on) the reject selection 156*a*. The rejection of the notification 152*a* (the notification status) can be indicated by content included in (e.g., a color of) a notification indicator 154*a*. A user can acknowledge a notification by selecting (clicking on) an acknowledge selection (e.g., a acknowledge selection 158*a-b*). For example, a user can acknowledge the notification 152*b* by selecting (clicking on) the acknowledge selection 158*b*. The acknowledgement of the notification 152*b* (the notification status) can be indicated by content included in (e.g., a color of) a notification indicator 154*b*.

A user can drill down into a relevant application by selecting (clicking on) a more info selection (e.g., a more info selection 160*a-b*). In some cases, a user may contact someone directly in response to a notification.

Figure 1I:
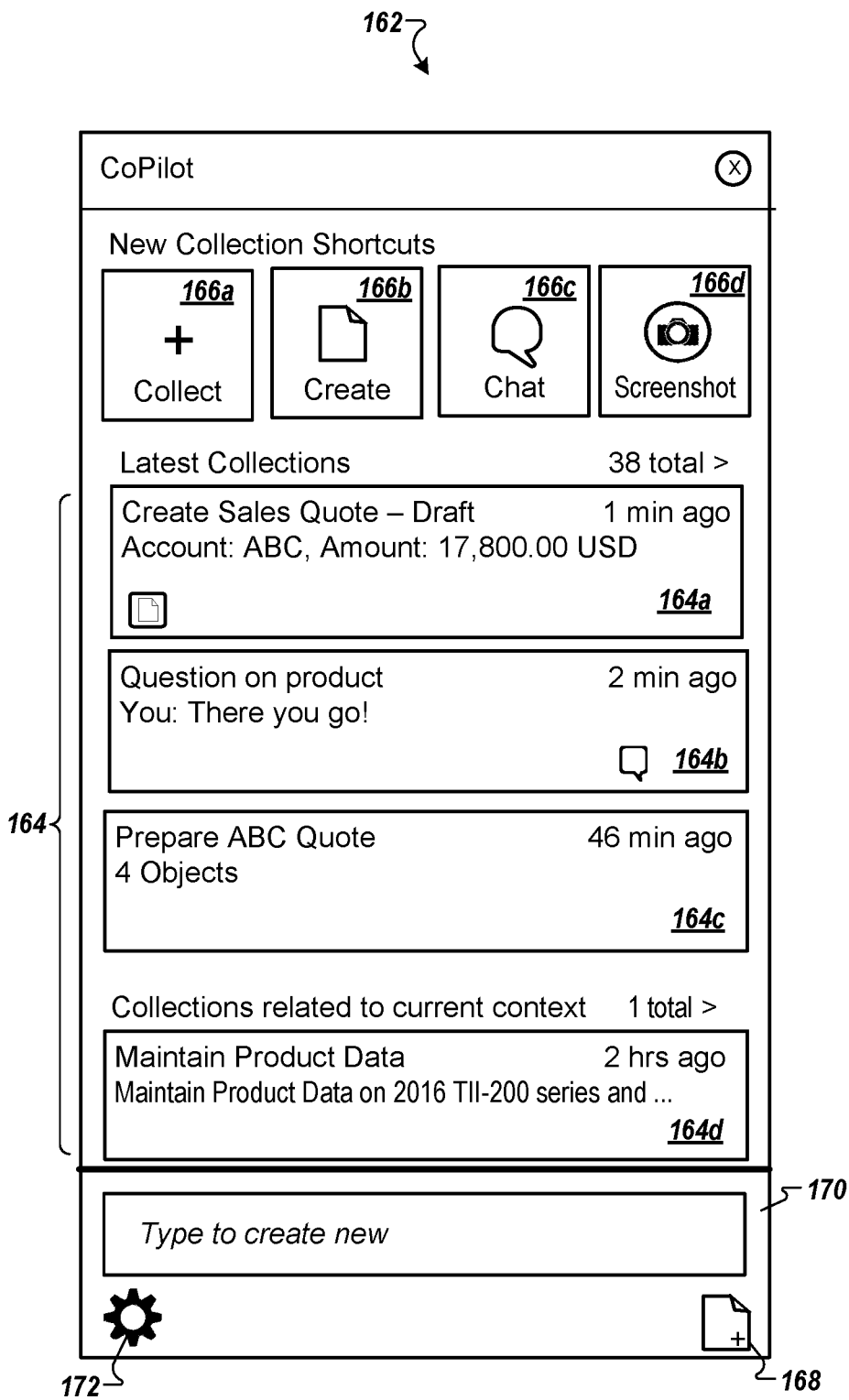
FIG. 1I is an illustration showing an example copilot user interface.

FIG. 1I is an illustration showing an example copilot UI (e.g., copilot UI 162). For example, referring to FIG. 1C, a copilot application can be launched from the launchpad 112 when a user selects (clicks on) the copilot launch icon 113. The copilot application can provide (generate and display) the copilot UI 162. In some cases, the copilot UI 162 can float over the UI included in the launchpad 112. As a floating UI control, the copilot UI 162 can be visually unobtrusive and flexible in its cross-functional omnipresent implementation across any device or application screen.

The example copilot UI 162 is an example copilot start page or start screen. The start screen (the copilot UI 162) can be an entry point for copilot functionality for an enterprise system.

The copilot UI 162 can provide shortcuts to different copilot features. For example, as shown in FIG. 1I, a collection can be represented by an entry in a collection list 164 that includes collection list entries 164*a-d*. A copilot collection can be a cluster of items in relation to a specific topic. For example, an item can be a note, a screenshot, a chat message, a copilot message, an object, or a quick create. In some implementations, the items included in the collection can be homogeneous (e.g., all of the items are of the same type). In some implementations, the items included in a collection can be non-homogeneous (e.g., the items can be of different types). Each collection list entry 164*a-d* can provide a representation of a collection that can include a title, a timestamp (e.g., last changed), a visual content summary, and a textual content preview. In some implementations, the collection list 164 can be searched and/or filtered.

For example, the selection of a copilot shortcut 166*a-d* can allow a user to create and navigate to a new collection with a specified intention. The selection of a copilot create icon 168 located in a copilot footer toolbar 170 can create and navigate to a new plain collection. The selection of a copilot settings icon 172 located in the copilot footer toolbar 170 can allow a user access to copilot settings (e.g., display a copilot settings UI, open a copilot settings application, etc.).

Copilot entries can be living, gradually growing artifacts and software entities that can accompany a user from the identification of an issue to a solution for the issue, while providing support in the form of relevant context and actions. Copilot entries can serve as memory aides while the copilot entries can incrementally evolve into valuable transactional tasks and collaborations as they mature in meaningful ways that bridge a gap between predefined application functionality and processes based on personal ways of working for a user. Though the example shown in FIG. 1I describes launching the copilot application from the launchpad 112, referring to FIG. 1A, the copilot application can be launched from other screens displayed in (included in) the shell main container 104, the left container 102, and/or the right container 106.

Copilot entries can be made ready for users to use when communicating, collaborating, and creating actionable transactions in desktop or mobile scenarios. For example, copilot text entries can be analyzed for recognizing and identifying relevant text related objects. Copilot text entries can emphasize displayed text, and a copilot application can recommend contextual entities for use in a current task. The copilot application can understand user context and can intelligently propose selections, auto-entries, and user options.

A smart template can provide a framework for generating user interfaces at runtime for an enterprise application. For example, a smart template can be used to generate the UI for the overview page 120 as shown in FIG. 1D. In another example, a smart template can be used to generate the UI for the object page 124, as shown in FIG. 1E. A smart template can provide a framework for generating the user interfaces based on metadata annotations and predefined templates for the most used application patterns. The use of smart templates can ensure design consistency by providing centralized high quality code by using predefined templates and controllers. The use of smart templates can keep applications up to date with evolving design guidelines. The use of smart templates can reduce an amount of front-end code used in building enterprise applications. The term "smart" can refer to annotations that add semantics and structures to provided data. The term "smart" can also refer to the way in which the templates understand the semantics.

Figure 1J:
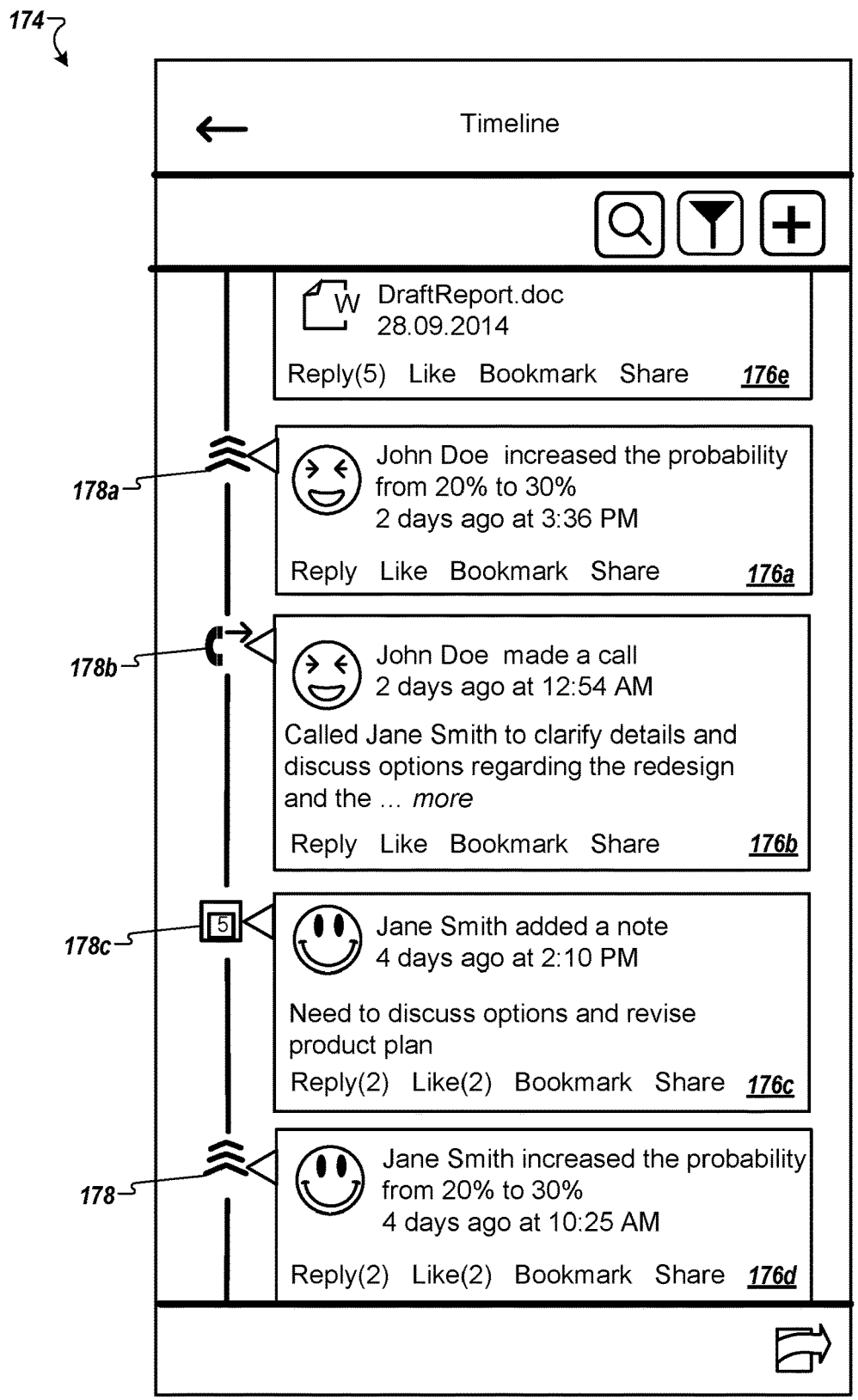
FIG. 1J is an illustration of a timeline user interface that can display timeline entries.

FIG. 1J is an illustration of a timeline UI (e.g., the timeline 174). A timeline UI (e.g., the timeline 174) can display timeline entries 176*a-e*. For example, the entries can be events, objects, and/or posts listed and displayed in a chronological order. The timeline 174 includes nodes 178*a-d* that correspond to respective timeline entries 176*a-d*.

The timeline 174 can be used for collaborative communications. The timeline 174 can be configured in multiple different ways depending on use case implementations. For example, the timeline 174 can provide information about changes of an object or about events related to an object. The timeline 174 can provide information about generated entries (e.g., value XY changed from A to B) or about manual entries (e.g., comments from an individual). In some implementations, the latest entry is at the top of a list displayed by a timeline. In some implementations, the timeline 174 can be displayed along with a business object. In some cases, the timeline 174 can be displayed to the right of the business object.

Two example versions of a timeline can include a basic timeline and a social timeline. A basic timeline can be a read-only timeline. A social timeline can allow for interaction and collaboration among users.

Figure 2:
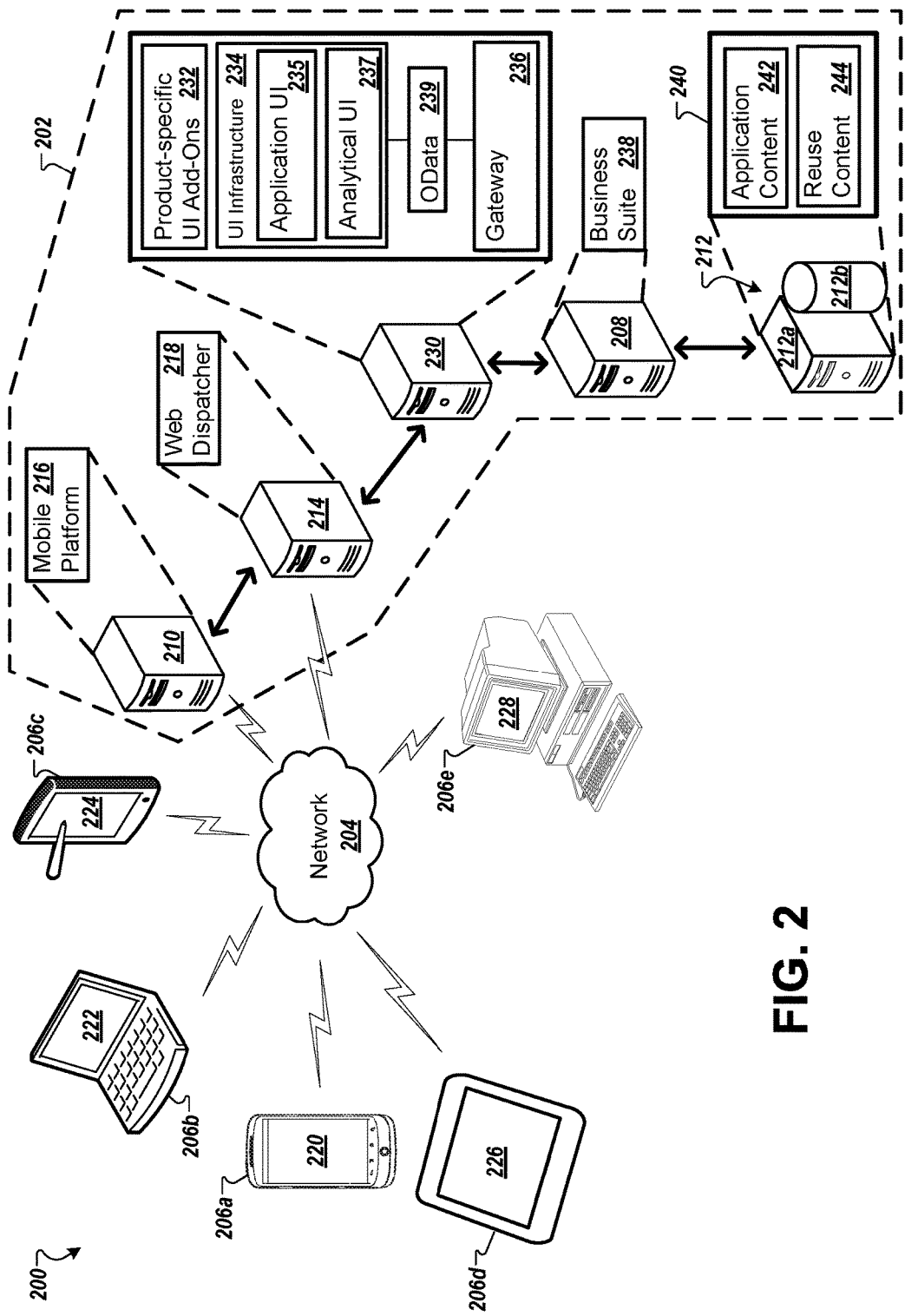
FIG. 2 is a diagram of an example system that can implement the user interfaces and user experiences described herein.

FIG. 2 is a diagram of an example system 200 that can implement the user interfaces and user experiences described herein. The system 200 includes an enterprise computing system 202, a network 204, and client computing devices 206*a-e*.

For example, computing device 206a can be a mobile phone, a smartphone, a personal digital assistant, or other type of mobile computing device. The computing device 206a includes a display device 220. For example, computing device 206b can be a laptop or notebook computer. The computing device 206b includes a display device 222. For example, computing device 206c can be a tablet computer. The computing device 206c includes a display device 224. For example, the computing device 206d can be a wearable device such as a smartwatch. The computing device 206d includes a display device 226. For example, the computing device 206e can be a desktop computer. The computing device 206e can include a display device 228. A user of the computing devices 206a-e can use/interface with the display devices 220, 222, 224, 226, and 228, respectively, when interacting with the enterprise computing system 202. The computing devices 206a-e can display on the display devices 220, 222, 224, 226, and 228 any of the screens and UIs described herein.

The enterprise computing system 202 can include one or more computing devices such as a web management server 214, a frontend server 230, a backend server 208, and a mobile device management server 210. The enterprise computing system 202 can also include a database management computing system 212 that includes a database management server 212a and a database 212b. Though not specifically shown in FIG. 2, each server (the web management server 214, the frontend server 230, the backend server 208, the mobile device management server 210, and the database management server 212a) can include one or more processors and one or more memory devices. Each server can run (execute) a server operating system.

In some first implementations, the client computing devices 206a-d (e.g., the mobile computing devices) can communicate with the enterprise computing system 202 (and the enterprise computing system 202 can communicate with the client computing devices 206a-d) by way of the mobile device management server 210. The mobile device management server 210 includes one or more mobile device platform application(s) 216. By using the mobile device platform application(s) 216, the enterprise computing system 202 can deliver cross-platform, secure, and scalable applications to the computing devices 202a-d, independent of the mobile computing device-type (e.g., laptop, notebook, smartwatch, mobile phone, PDA, etc.) and independent of the operating system running on the computing device 206a-d. In these implementations, the mobile device management server 210 can then communicate with the web management server 214.

In some second implementations, the client computing devices 206a-e (both the mobile computing devices (computing devices 206a-d) and the desktop computing device 206e) can communicate with the enterprise computing system 202 (and specifically with the web management server 214), and the enterprise computing system 202 (and specifically with the web management server 214) can communicate with each of the client computing devices 202a-e) using the network 204. The web management server 214 includes a web dispatcher application 218. In both the first implementations and the second implementations, the web dispatcher application 218 can act as a "software web switch" accepting or rejecting connections to the enterprise computing system 202.

In some implementations, the network 204 can be a public communications network (e.g., the Internet, cellular data network, dialup modems over a telephone network) or a private communications network (e.g., private LAN, leased lines). In some implementations, the computing devices 206a-e can communicate with the network 204 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The frontend server 230 can include product specific UI Add-On Applications 232 and a UI infrastructure 234. The UI infrastructure 234 can include a design portion and a runtime portion. The frontend server 230 can decouple a lifecycle of a UI (e.g., design and runtime deployment) from the backend server 208. The decoupling can allow UI applications to interface with a plurality of different databases. The decoupling provides a single point of UI design, access, and maintenance allowing for theming, branding, configuring, and personalizing a UI without a need for development privileges to the backend server 208 (e.g., no need to have backend administrative rights). The decoupling can result in a more secure enterprise computing system. The decoupling can provide for rule-based dispatching of requests in a multi-system landscape (e.g., for approvals including aggregation).

The UI infrastructure 234 includes an application UI 235 and an analytical UI 237. The application UI 235 can provide any number of applications using the architectures described herein. The analytical UI 237 can provide analytical capabilities that can provide end-to-end business analysis including, but not limited to list reporting over multi-dimensional reports, dashboards, provision of analytical apps, and pixel-perfect formatted reports.

The frontend server 230 includes a gateway 236. The gateway 236 can provide a way to connect devices, environments, and platforms to enterprise software based on market standards. The gateway 236 can enable the development of UIs for use in different environments (e.g., social and collaboration environments). The gateway 236 can enable the development of UIs for use on different types of client computing devices (e.g., client computing devices 206a-e). The gateway 236 can enable the development of UIs for use in internet-based applications.

The frontend server 230 includes OData services (e.g., Open Data Protocol) services 239. OData services 239 are typically resource-oriented and all artifacts are network accessible objects that are identified by a Uniform Resource Identifier (URI) or an Internationalized Resource Identifier (IRI). The entry resource of an OData Service may be a service document. The service document may be the top level representation of an OData service. The service document may list entity sets, singletons, and functions of the same services. Resources provided in the service document may be accessed with a URL that may be the concatenation of the base URL and the resource URL. One example snippet of a service document is shown below: { "@odata.context" : "$metadata", "value" : [ { "name" : "Departments", "url" : "Departments" }, { "name" : "EMPLOYEES", "url" : "EMPLOYEES" }, . . . ] }

In some implementations, OData services 239 may represent OData services that can provide aggregation services, dimensional services, measuring services, and parameter passing services. In some implementations, OData services can also provide analytical services such as currency conversion, formula calculation, totaling services, hierarchy analysis, and write-back services.

OData services 406 can be used to represent properties. Properties in an entity type annotated as dimensions can group data in the result set and control how other properties annotated as measures are to be aggregated. A set of selected dimensions defines an aggregation level that is applied to the measures in the result. Properties associated with aggregated entities may be tagged with a corresponding annotation. In this case, the semantics of "$select" is extended to not only specify the shape of a result, but also an aggregation level for the result. The decision whether or not an entity type aggregates may be determined at design time and typically may not be changed by the consumer. Aggregation can be applied to any OData model by specifying the aggregation instructions in the OData request.

OData services 406 can be used to represent functions. Functions including sum, min, max, etc. may be applied to measures to calculate aggregated values for a selected level of aggregation. If a deviating aggregation function is used for some dimension, an exception aggregation can be defined for the dimension. The function may be applied and any exception aggregation can be hard-coded at model design time or can be overwritten by the consumer in an OData request. Arithmetic expressions (e.g., formulas) can include function calls for calculating new measures out of particular OData information.

OData services 406 can be used to represent currency conversion. Currency conversion may be used as a function for aggregating measures in data containing monetary values in different currencies. The conversion may use OData and may be built into the analytical model and supported by the analytic engines (e.g., engine 412). In some implementations, consumers can add conversion functions to the OData service 406, which can be referenced in the OData request.

OData services 406 can be used to represent aggregated entities. In some implementations, logic for calculating aggregated entities includes the use of certain input values. For example, parameterized aggregated entity types are accessed by a function import with all parameters in a particular parameter signature. Examples include a parameter for a target currency to aggregate amount values in business transaction documents that do have different currencies and/or a parameter for a key date to determine the exchange rate for the currency conversion. Parameters may be relevant for, but not limited to, analytical use cases and may additionally be used in transactional data.

In some implementations, totals may be aggregated entities that can be included in the actual result. They are aggregated at a higher level than the requested result and represent sub-totals at the specified higher levels or a grand total for the entire result. Examples may include a request for aggregated entities at level with dimensions Customer/Product/Year can include a request for sub-totals at the levels Customer, Customer/Product and a grand total. Totals can be requested by a custom query option.

OData services 406 can be used to represent leveled hierarchies and parent/child (P/C) hierarchies. Leveled hierarchies are generally composed of two or more dimension properties that form a hierarchy of fix depth. One example may include Country/Region/City. Aggregation along such a hierarchy can be achieved by adding some or all of its properties to the aggregation level. A P/C hierarchy for some dimension includes nodes. Each node can have an arbitrary number of child nodes. For example, hierarchies may be generated for product groups, cost centers, employees/manager, etc. In contrast to leveled hierarchies, P/C hierarchies can represent any sort of tree structure. Every node in a P/C hierarchy implicitly defines an aggregation level and all measures are aggregated accordingly. P/C hierarchies can be exposed by OData services 406 with annotations of the data aggregation extension. The latter also allows describing leveled hierarchies and offers additional runtime support for selecting interesting tree sections by dedicated P/C hierarchy filter functions such as isdescendant( ), isancester( ), etc.

OData services 406 can be used to represent write-back functionality. Write-back functionality refers to modifying measure values of an analytical result. Depending on the aggregation level of that value, it may be disaggregated and distributed to the contributing base data. Values can be modified interactively or by invoking a (planning) function that operates on a specified data scope and aggregation level to perform mass updates automatically. OData services 406 can provide the ability to write back values as advertised in updatability annotations in the service metadata.

The backend server 208 can include a bundle (a set) of business applications (e.g., business suite 238). The business applications can be transactional applications, analytical applications, and fact sheet and contextual navigation applications. Transactional applications can allow task-based access to tasks that can include create and change. In addition or in the alternative, transactional applications can allow access to entire processes with guided navigation. Analytical applications can provide a user with a visual overview of complex tasks for monitoring and tracking purposes. Fact sheet applications and contextual navigation applications involve search and explore activities. Fact sheet applications and contextual navigation can allow a user to view essential information about an object and can allow contextual navigation between related objects.

The database management computing system 212 includes a database management server 212a that can run (execute) applications that can manage a database 212b. For example, the database 212b can be an in-memory, column-oriented, relational database (e.g., SAP HANA®). The database management computing system 212 can include extended application services 240 that can embed a full featured application server, web server, and development environment within the database management computing system 212. The extended application services 240 can include application content 242 and reuse content 244 for use by the enterprise computing system 202 when providing a personalized, responsive, and simple UX across different types of computing devices and deployment options.

In some implementations, accessing embedded analytics may include accessing a FIORI Launchpad (FLP) tile and/or a FIORI Overview Page (OVP) and artifacts therein, and/or a FIORI Analytical List Page (ALP) and artifacts therein, etc.—This may provide an analytical perspective including, among other things, various combinations of one or more dynamic charts, graphs, tables, etc. that incorporate things such as data (in any number of forms including live, real-time, near real-time, cached, etc.), user particulars (such as role, current context, tasks, etc.), UI components to provide a user with actionable insight.

Figure 3:
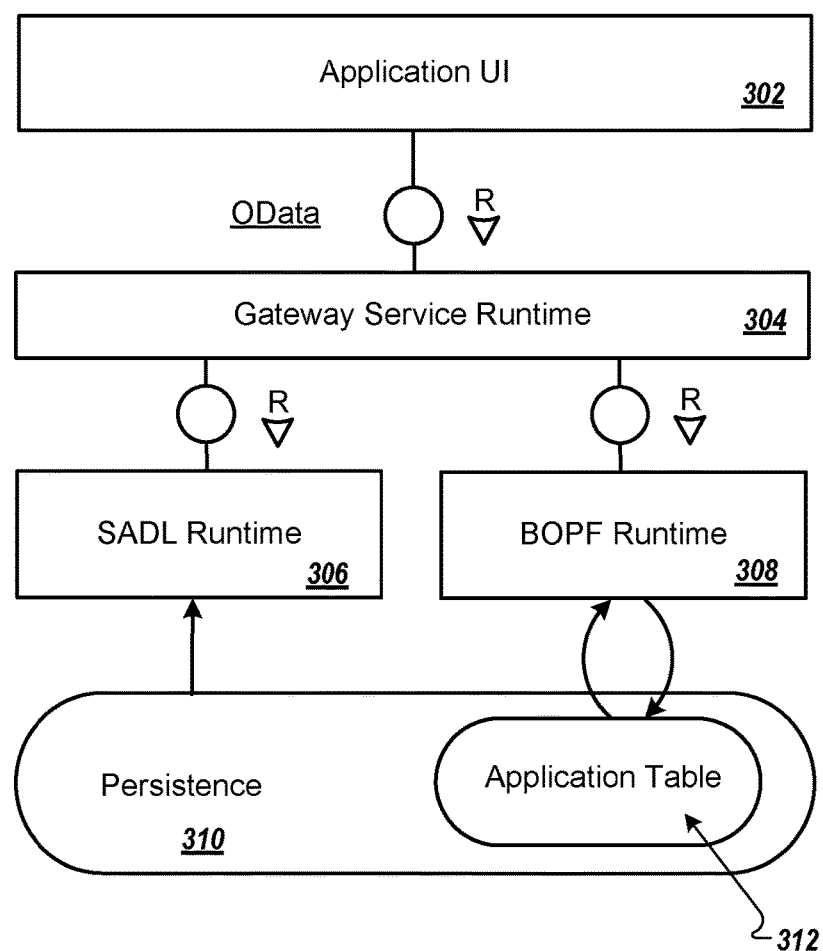
FIG. 3 is a block diagram of example architecture components utilizing OData services to generate embedded analytics.

FIG. 3 is a block diagram of example architecture 300 illustrating components utilized with OData services. The architecture 300 may function in combination with architecture 200 (or in combination with other depicted architecture shown in this disclosure). In general, the programming model utilizing OData services in the architecture 300 enables read and transactional access to application data.

In general, the components shown in FIGS. 2 and 3 may execute applications in a scalable manner in, for example, a cloud environment, which can be accomplished using the OData protocol that follows many of the principles of the REST paradigm. The OData services may define the common access layer for consuming application data.

In operation, the FIORI programming model is built on an application infrastructure for OData services that allow read and transactional access to application data. As shown, the architecture 300 includes an application UI 302 (e.g., application UI 235 (FIG. 2)), a gateway service runtime 304 (e.g., gateway 236 (FIG. 2)) and a Service Adaption Definition Language (SADL) runtime 306. The application UI 302 includes any number of SAP.UI5 components. The SADL is an ABAP technology that enables the consumption of entity relationship-like data models in ABAP based on a model-driven approach. In operation, SADL enables fast read access to database and data for scenarios on mobile and desktop applications using query push-down functionality.

The architecture 300 also includes a Business Object Processing Framework (BOPF) runtime 308. The BOPF runtime 308 is an ABAP based framework that provides a set of generic services and functionalities to speed up, standardize, and modularize development of applications. The BOPF runtime 308 may manage the entire life cycle of business objects and may cover all aspects of application development. The architecture 300 also includes a persistence database 310. The persistence database 310 may include any number of application tables 312 that represent application-specific data stored according to area of the architecture. The BOPF runtime 308 contains logic to eventually update application table entries within application tables 312. The gateway service runtime 304 may map read accesses to the SADL runtime 306 and write-accesses to the BOPF service runtime 308 calls.

In operation, the SADL runtime 306 translates read requests to corresponding SQL statements and executes the translated statements via the ABAP Query Interface on the persistence of core data service views. The core data service view is a metric that can be used for data modeling by S/4 HANA. The OData service 314 may be used to expose these models for consumption by one the application UI 302. In one example, OData services may be generated dynamically from particular core data service views without the need to implement a service provider manually. The selected design times and implementation provide OData exposure yielding a dedicated service for a selected view, and the gateway service runtime 304 supports referenced data sources that allow including multiple core data service views in one OData service 314.

Figure 4:
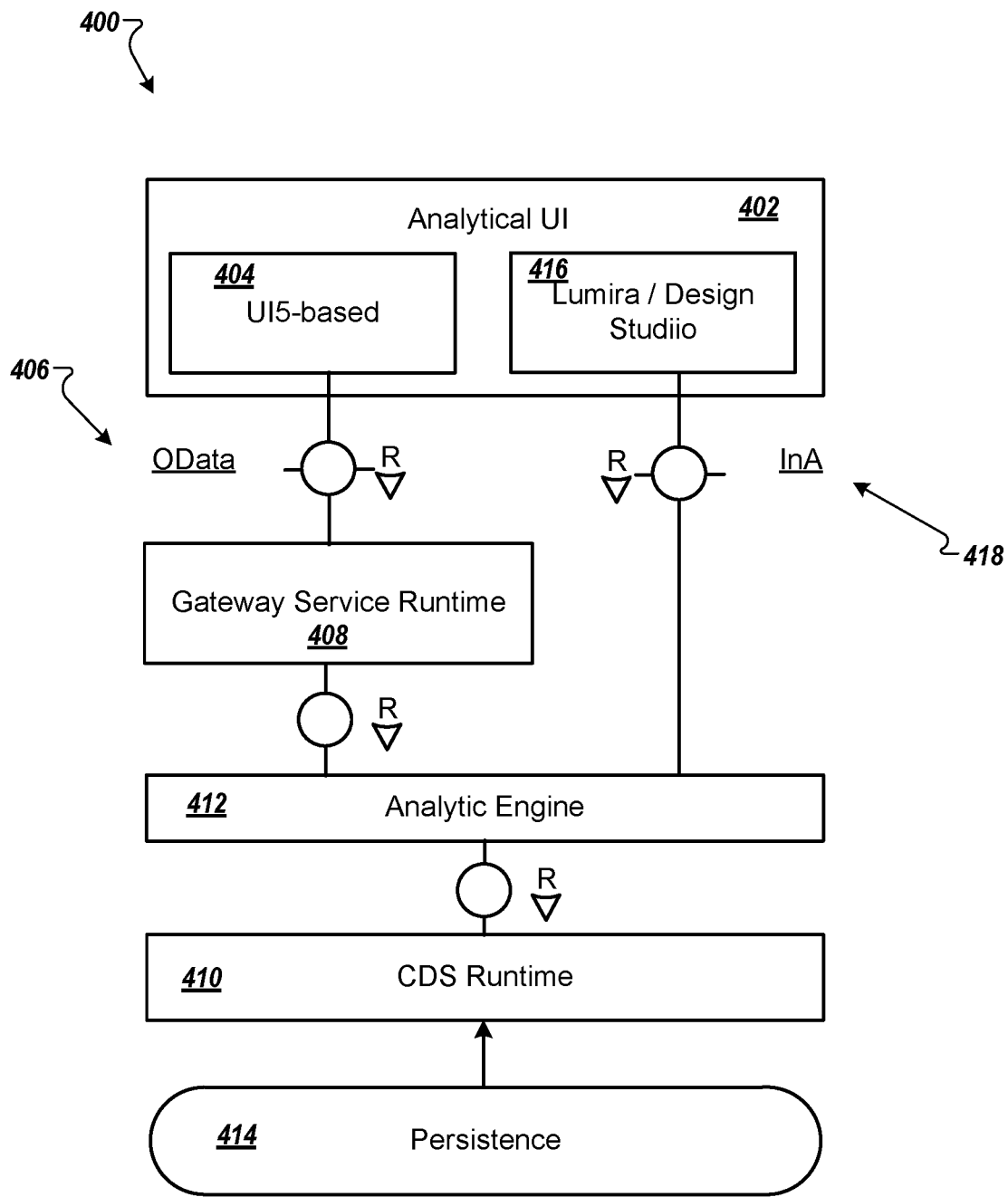
FIG. 4 is a block diagram of example architecture components utilized with OData services.

FIG. 4 is a block diagram of example architecture 400 illustrating components utilized with OData services. The architecture 400 may function in combination with architecture 200, and/or 300, (or in combination with other depicted architecture shown in this disclosure). Analytical capabilities can be carried out using architecture 400 to provide end-to-end business analysis including, but not limited to list reporting over multi-dimensional reports, dashboards, provision of analytical apps and pixel-perfect formatted reports.

The architecture 400 includes an analytical UI 402 built with (e.g., developed with) SAP.UI5 (e.g., UI5-based 404). The analytical UI 402 may utilize OData 406 to generate analytic content. For example, OData 406 can be used to expose analytical models using the model design times and access APIs.

The analytical semantics of OData models for these existing backend models can be expressed with annotations to the service metadata. In some implementations, OData 406 can include an extension for data aggregation. This extension covers all aspects of the analytical extensions. The extension can additionally provides capabilities that allow OData consumers to control analytical functionality with appropriate service requests at runtime.

A gateway service runtime 408 can generate initial support for services using OData 406, which provides data aggregation as well. The data model for analytics may be directly based on the primary application storage in order to achieve a seamless integration with transactional data in real time. For this purpose, a dedicated core data service views (associated with CDS runtime) with analytical annotations (generated by analytic engine 412 and persisted in persistence database 414) are put on top of other, lower-level core data service views and application tables.

In operation, analytical application UI 402 built with SAP.UI5 access analytical data from OData services 406 that forward the requests to the analytic engine 412. Other analytical applications can be built as well with design studio/Lumira 416. In addition, generic Lumira end user frontend may connect to the analytic engine via an information access (InA) protocol 418. In some implementations, the analytic engine 412 may access data via Open SQL from core data service views persisted data using (transient) multi-dimensional data structures derived from the underlying core data service views that do have analytical annotations. As a result, much of the analytical consumption is based on OData 406 and may be based on analytical access to core data service views with the same data models and storages as transactional scenarios.

In some implementations, OData services 406 can be used to represent lists and charts. For example, OData services 406 can provide information structured by a parent/child hierarchy which can be displayed in a tree table UI that provides comparable functionality. Operational reporting on business documents, work items, etc. can begin with such table UIs. In addition to standard functionality for sorting, filtering, and paging, the analytical table can group the displayed items on all available dimensions, measures, which are automatically aggregated. Chart UIs rendering the same information in one of many chart types (e.g., line, column, pie, etc.) complement such table UIs. Users can switch instantly between tabular and chart display by connecting to any aggregating OData entity set. If a particular OData service also supports totals, the grouping performance can be further improved by fetching multiple group levels with a single OData request.

Figure 5:
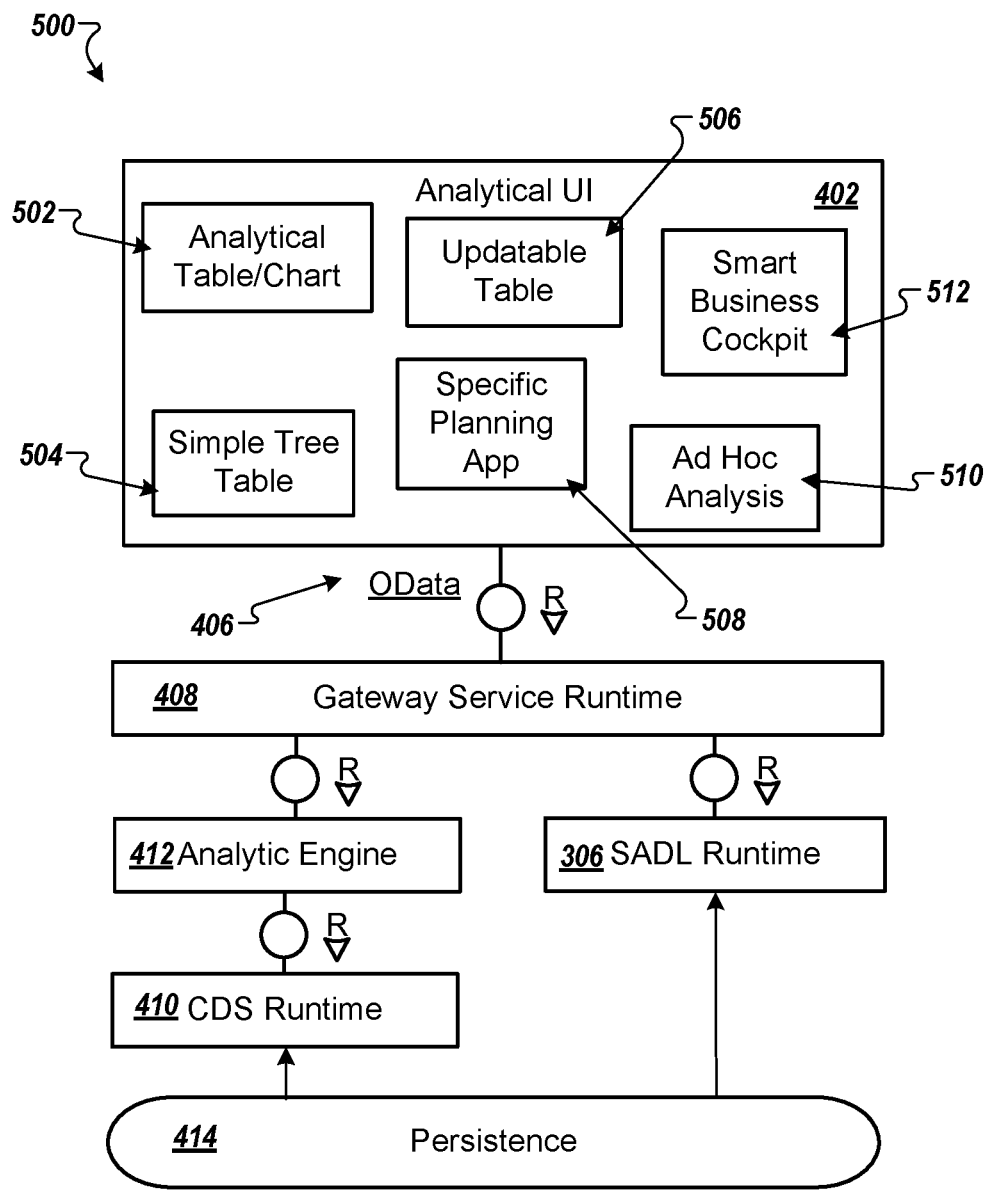
FIG. 5 is a block diagram of example architecture components utilizing OData services to generate embedded analytics.

FIG. 5 is a block diagram of example architecture 500 illustrating components utilized with OData services. The architecture 500 may function in combination with architecture 200, 300, and/or 400 (or in combination with other depicted architecture shown in this disclosure). As described above, the architecture 500 also includes an analytical UI 402, a gateway service runtime 408, an analytic engine 412, an SADL runtime 306, a CDS runtime 410, and persistence database 414.

The analytical UIs 402 may provide analytical tables 502, tree tables (e.g., hierarchies) 504, updateable tables (e.g., write-back) 506, specific planning applications (e.g., write-back) 508, and ad hoc analysis (e.g., using OData data aggregation) 510.

On the server side, two components can serve analytical OData services 406. The analytic engine hosting the analytic UI 402 is based on OLAP technology. The CDS runtime views 410 with analytical annotations are translated to queries, for which OData query services can be provided on top. All these transformations occur at runtime and map metadata from one layer to the other without creating redundant models. The analytic engine offers data grouping, analytical aggregation, formula calculation, currency conversion and totals, includes a hierarchy engine and planning functionality. Therefore, with this generic approach, the analytic engine can make basic and all advanced analytical OData features available.

The SADL runtime 306 can also generically expose analytical OData services for CDS runtime views 410 with @DefaultAggregation annotations. Ultimately, SADL maps incoming OData requests to SQL statements executed via the ABAP Query Interface (supporting HANA but also any database). Hence, by using standard SQL features for grouping and aggregating and not the ABAP runtime, stateless requests can be processed very fast, with the restriction that it supports only the basic analytical features also present in SQL.

In some implementations, the architecture 500 can provide a multi-dimensional report UI that allows exploration of a given data set. Data sets can be sliced and diced according to multiple dimensions in order to look at the data from different angles. Such reports consume data in a cell-oriented way (like in a pivot table) as opposed to the row-oriented results in an OData entity set.

In some implementations, the architecture 500 can include a smart business cockpit 512 that offers real time visualization of key performance indicators (KPIs) including trends, thresholds and alerts. It includes a standard method for multi-level analysis and integrates with other analysis and collaboration tools. A tile (not shown) on the cockpit may depict one or more KPI values. Every such KPI value is a measure value aggregated over available dimensions. The KPI analysis steps offer various rendering options for selected measures and aggregation levels. Therefore, smart business cockpits 512 can be supported by the basic analytical OData features.

In some implementations, the architecture 500 can provide pixel perfect reports (sometimes also referred to as "Reporting"). Use cases are ranging from structured but nicely formatted cost center reports to externally used annual reports or infographics. Typically, a user uses a reporting tool to define the report, which is then rendered in various formats (PDF, RTF, HTML, . . . ) or made available through a (proprietary) viewer application to an end user. The tools usually operate directly on HANA views or queries. The formatting is then stored in the design time file in a proprietary format.

In some implementations, the architecture 500 can provide planning applications which refer to a class of applications that typically update data on aggregated levels. It starts with an ordinary write-back capability integrated into a simple list of aggregated measures in editable columns. At the other end of the spectrum, sophisticated planning applications for specific business purposes combine manual value entry with the option to perform mass-updates of values.

In some implementations, the architecture 500 can provide ad-hoc analysis that is characterized by the fact that similar to the multi-dimensional reporting, users do not necessarily know where the analysis path will lead them or on which data to focus in the beginning. While for a multi-dimensional reporting, the data set (an entity set in OData) is fixed and therefore not extensible during the analysis, it is part of the ad-hoc analysis that the interesting entity set is authored on-the-fly at runtime from the available entity sets and the possible navigations between them. In addition, this may also include the definition of calculated measures.

In operation, the OData service provider is based on an API used for consuming queries. Such queries suggest highly interactive and possibly data-intensive use cases and therefore rely on a state-ful analytic engine. In order to optimize stateless OData access to the state-ful processing in the analytic engine, quite some effort had been spent in the past to introduce shortcuts for the row-oriented data access. The architecture 500 may provide options for utilizing a gateway soft state in order to leverage the engine's cache of hierarchies and query results.

In general, the SADL runtime 306 is a transformer, which maps OData requests to corresponding (HANA) SQL statements; it may not implement extra functionality on top and is therefore limited to the capabilities provided by (HANA) SQL. SADL runtime 306 provides a faster initialization of metadata access and authorization check, which prepares for a session with state-ful interactions by maintaining certain buffers for subsequent reuse, for example. Furthermore, the SADL has a relational access to data that can be copied to the OData result very fast, because it perfectly matches the OData result structure. The analytic engine internally represents query results in a grid and processes data cell by cell when adding it to the output result, which yields a slower throughput.

At design time, during the activation of an analytical CDS view to be published via OData 406, the analytical CDS annotations can be introspected in order to determine the particular feature level. For example, if a CDS view contains the @Analytics.query:true annotation and a @Hierarchy annotation, it can be executed by the analytic engine. Without the @Hierarchy annotation, it can also be executed by the SADL runtime. Of course, this is only a simplified example, and accordingly, a complete set of rules for all relevant CDS annotations can be identified.

The performance of architecture 500 can be further optimized by deferring the decision about the service implementation to runtime. Assuming a service provider that can delegate an incoming OData request to either execution runtimes, an OData request can be executed by the faster SADL even though the analysis at design time has shown that the CDS view contains annotations that utilize the analytic engine. As an example, consider the case of a @Hierarchy annotation. As long as a concrete OData request does not reference the OData entity type properties related to the hierarchy, it can be executed by SADL (if all other conditions are met as well). Another example is a CDS view with annotated write-back capability (at time of writing, this annotation had not yet been finalized). While OData updates are typically processed by the analytic engine, all OData read requests could be served by SADL. In order to freely exchange the service implementations case by case, both implementations expose an identical service structure and identical OData request/response pairs to provide consistency.

Consistency in this context refers to the expectation that an analytical OData service for a CDS view has an immutable structure and a unique runtime behavior. These aspects cannot be taken for granted when multiple service providers come into play: SADL's processing logic is entirely based on (HANA) SQL, while the analytic engine uses Open SQL for accessing data and further logic implemented with ABAP for processing. Regardless which service provider is selected for a given request, both produce the same service document and metadata document. Names for entity types, properties, entity sets and function imports are typically identical. All model structures are to be identical.

At runtime, SADL and the analytic engine produce the same results for the same requests. This includes (1) returning the same set of aggregated entities, and the implementations of the aggregation function they apply to measures return the same values (2) if a measure to be aggregated is associated to a unit or currency that is also included in the result, both runtime implementations return the same values for them (3) measure calculations may cause arithmetic errors that may not lead to rejecting the request (broken measure values are represented by constants INF and NaN as appropriate), and (4) since the provider selection can be deferred to runtime, both return identical IDs as keys for the returned aggregated entities.

The ABAP Application Infrastructure may provide for three approaches creating analytical OData services: classic SEGW, OData exposure via CDS tooling, and OData exposure via SEGW.

An SEGW project is the starting point for this approach. The entire model of the service is defined within the project. OData entity sets can be mapped to a variety of modeled data sources, e.g., CDS views, DDIC tables, external DDIC views for HANA views. Analytical extensions from OData4SAP can be added manually to the model provider extension class of the service provider (MPC_EXT).

The OData exposure via CDS tooling approach starts with a selected CDS view that shall be exposed via OData. CDS tools allow to expose a CDS view via OData by adding a simple annotation: @OData.publish:true. Whether the resulting OData service will include analytical extensions is determined by the annotations of the exposed CDS view. If the CDS view contains annotations for analytical consumption (@Analytics.query:true) or aggregation of measures (@DefaultAggregation), an analytical OData service will be exposed. A mapping from CDS annotations to analytical OData4SAP extensions can be defined and used. Whether the analytic engine or SADL will serve requests against the analytical OData service at runtime depends on the analytical capabilities and is transparent for the application developer at design time.

The OData Exposure via SEGW approach has the restriction that only the canonical transformation from CDS to OData can be performed. More complex services with CDS OData exposure are supported by the SEGW with the concept of referenced data sources. With this, an SEGW project can reference one or more CDS views and associations between them and expose all of this to OData in a single service.

While the OData exposure via CDS tooling centers on the data model, the OData exposure via SEGW allows defining a service tailored to specific UI needs such that all entities are accessible from a single service. Regardless of that both exposure approaches apply the same transformation of CDS to OData.

If analytical data is to be consumed in integration scenarios with other applications, the OData service acts as known and accessible consumption endpoint. The actual consumption use case may be known or unknown, but cannot be controlled. Any component that wants to consume analytical data from a Fiori application system typically understands the OData extensions (metadata annotations, model structure) for analytics described and referenced in this document.

In general, FIORI embedded analytics can be integrated with other applications within the UX described herein. When analytical data is to be consumed in integration scenarios with other applications, the OData service may act as a known and accessible consumption endpoint. Any component (e.g., application) that attempts to consume such analytics from a Fiori application system may interact with one or more OData extensions (metadata annotations, model structure) to manipulate and present data.

Figure 6A:
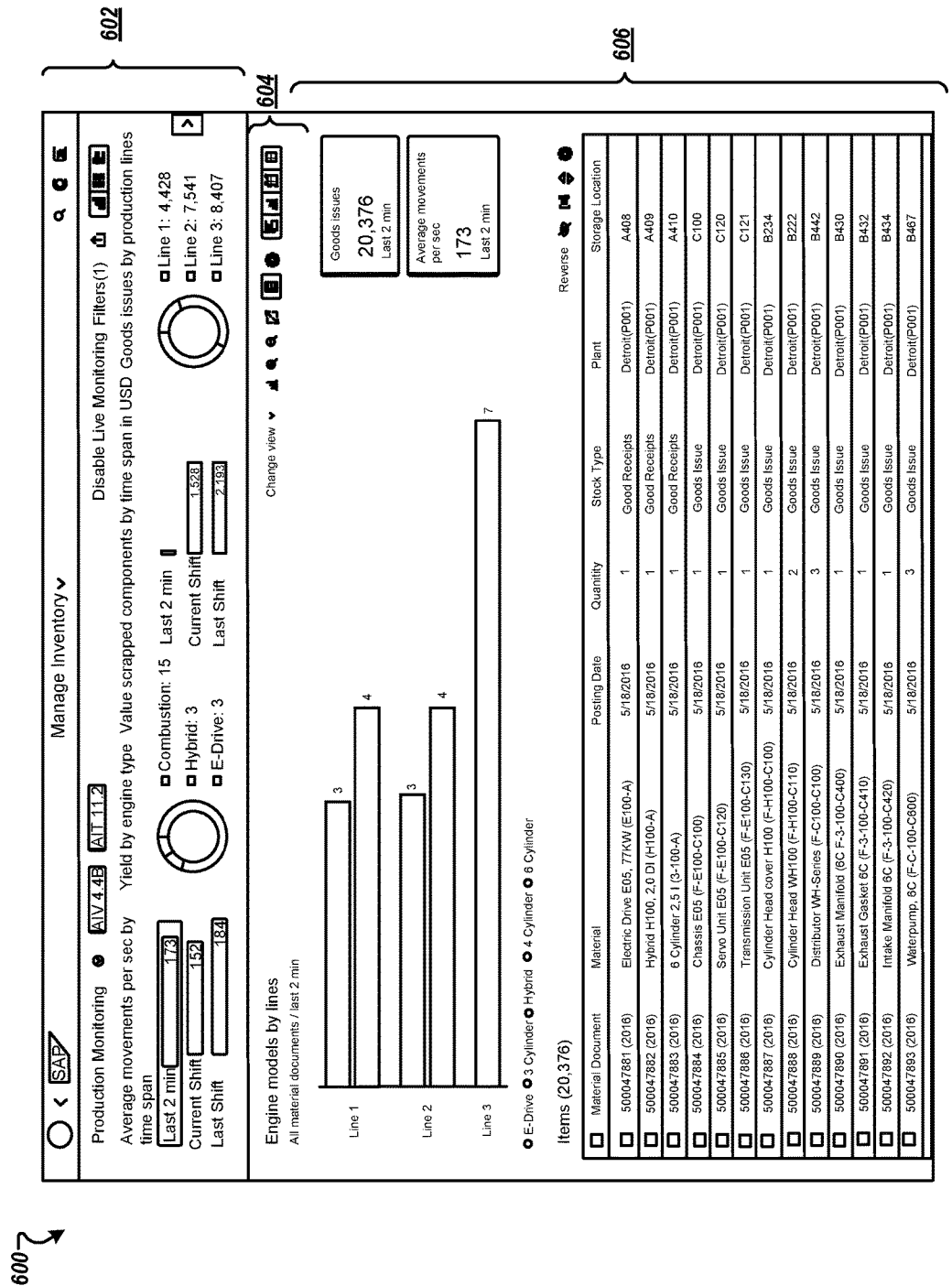
FIGS. 6A-6D are screenshots depicting example elements on an analytical list page.

FIG. 6A is an example screenshot depicting an analytical list page 600. The analytical list page 600 can provide a user with a number of overviews that include, but are not limited to headers 602 (e.g., global Key Performance Indicators (KPIs)/interactive KPI tags, filter bars 604 (visual & facet filters), content areas 606 (e.g., multiple views such as chart & table, chart only, cross table, etc.). The header 602 shows visual filtering as a reduction of steps to shrink data sets and to provide content visualization based on transactional content items. The transactional content 606 depicts a comprehensive view on transactional content.

In general, the analytical list page may enhance typical list reports by applying KPI tags, visual filter bars, interactive charts, and other visualization options. Such a report can create an environment in which the user is able to control the way in which data is presented. While the option of working using only the classic filter bar and the table is still there, the user now also has the option to switch on the analytical capabilities while continuing to work with transactional applications and content.

Figure 6B:
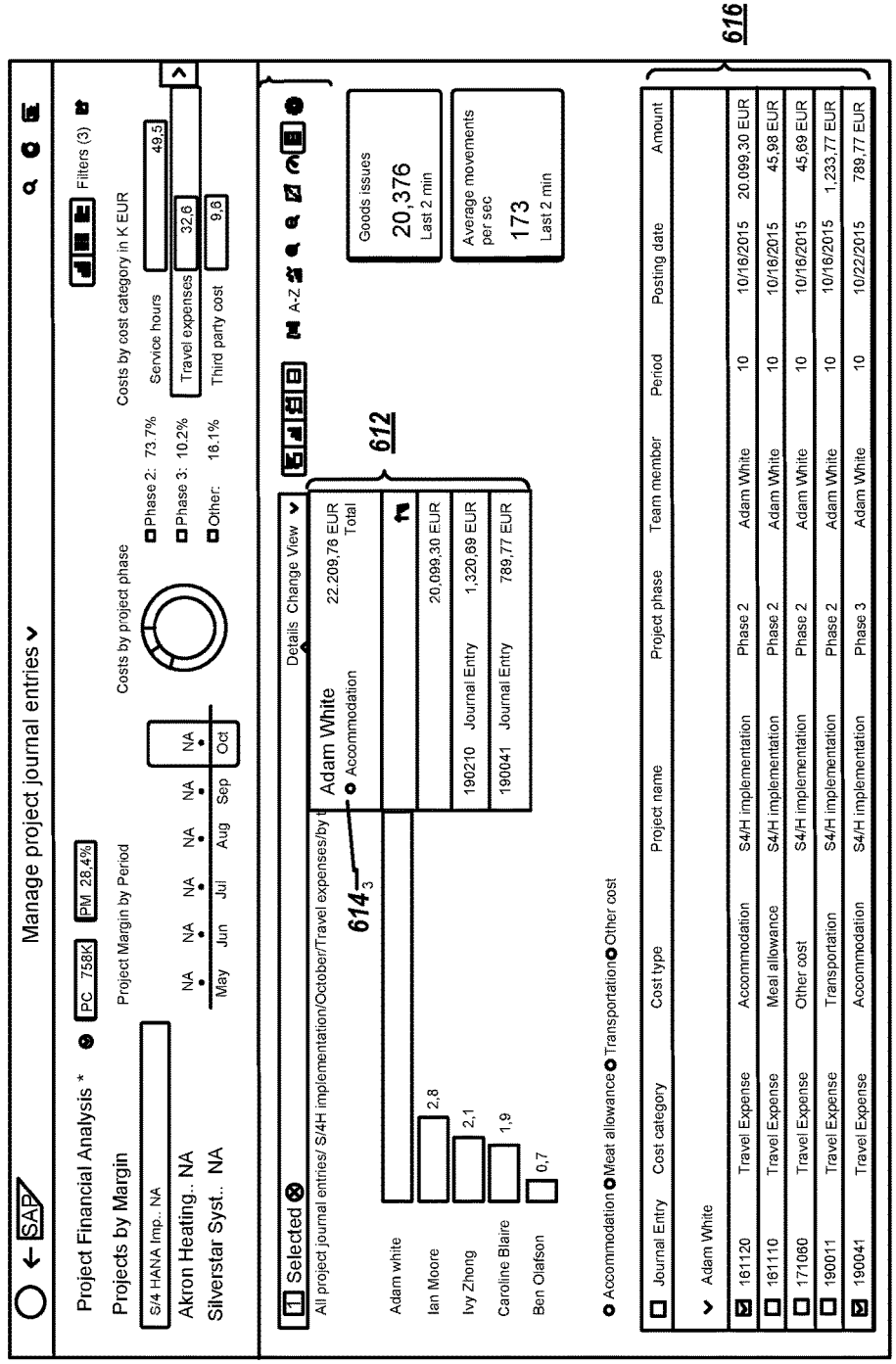

FIG. 6B is an example screenshot 610 depicting an analytical list page showing a chart selection at menu 612. Here, the user is performing a project financial analysis within an application for managing journal entries. The user can input detailed information on a particular chart selection using annotations 614. The user can also access items via chart detail view or table view by selecting one or more accommodation items. The one or more selected items may appear in area 616.

In general, the system 200 can employ the services described herein to make analytics available directly in a user's work environment. The user may access the information needed to make a decision in the same place as where this user actually executes the action. For example, the user may access an overview page (i.e., a page that offers an overview of a set of tasks or a domain including analytical visualizations, lists of items, and references to apps or tasks within that domain), list (report) page (i.e., a page that lists items based on a certain query. The page provides a powerful means to filter large sets of items and navigate to a more detailed view of these items), and/or an object page (i.e., a highly flexible page that can be used to display all aspects of a single object. The page may be optimized to accommodate information of various complexities and volumes).

An example list report page may include one or more filters and one or more tables/graphics. In general, the list report page may be used to manage large sets of data. For example, a list report may handle several thousand items and therefore may employ a powerful filter control (depicted in one example as filter bar 604 in FIG. 6).

The list report can be updated to provide a mechanism in which to make selections to filters. The filters can be applied to visualize data, drill down into data, perform multidimensional analysis of the data, and/or to progressively disclose KPIs. The update to the list report may be an analytical list report that provides, instead of a list, one or more charts to visualize the content. In some implementations, the analytical list report can combine tabular and visual representations to allow the user to interactively select or filter the related content. In some implementations, the user can determine whether to generate charts, tables, or a combination of both in an analytical list report. The charts may be interactive and allow the user to influence the data in the table (when displayed). At least two modes may be provided. The modes may include a master-detail mode in which the selection in the chart filters the items visible in the table to those that match the selection in the chart and a selection mode in which the selection in the chart also selects the corresponding items in the table so that a user can take action on these.

The analytical list page can include visual filters. Visual filters may be displayed as a set of interactive charts representing different aspects of data. Selections to visual filters may be directly reflected in the other charts and in the page content. For example, if a user selects a particular visual filter, one or more graphics or charts within an application area may be modified according to the visual filter selection.

Using a chart to filter the contents of a large set of items may provide an intuitive view for the user. The filtering may be helpful to the user because it provides immediate feedback on the structure of the data. Typically, there are various dimensions along which the user would like to filter and explore the data, and not all of these need to be in focus as with a chart showing various combinations of data. The visual filter can be used to narrow the focus of the data and display that focus graphically. The visual filter may include multiple smaller interactive charts that display different aspects of the data. These charts are dependent on one other so that selecting one chart influences the others, and the effect of every filter can be directly displayed in the visualization.

The visual filter is not only a great way to filter the data in a very simple and intuitive way along a few main dimensions, but it also provides a summary of the data contained in a particular data set. Large sets of information can be condensed in a few expressive charts. Although the visual filter may not replace the more powerful text-based filter bar, it offers a complementary way of narrowing large data sets.

In some implementations, the systems and methods described herein can enable drill down functionality (e.g., provide a view of various depths of the data). For example, the user can use various controls to drill down by predefined dimensions which are then also reflected in the item view in a table depicting the items Similar to the analytical drill down applications in SAP Smart Business, the embedded analytics concept enables users to drill down along certain dimensions in the list report page as well. Using the chart, the user can identify the values and measures, and select the dimensions the user would like to explore. The exploration in the chart may be reflected in the table by applying appropriate groupings to the data. By combining the chart and table, the results can be directly reflected at item level, connecting the aggregated level to the individual entries. Drill down dimensions can also be used to control the grouping in the table to reflect any underlying questions the user may have with the data. This way, the separation of the analytically-oriented drill down applications and the list report allowing actions at item level are eliminated. The user can now explore individual items and take action at any time.

Once a user has filtered down a large data set, the next step may be to run a more detailed analysis on this set of items. At this point, most users would typically export the data and analyze it using third-party tools. This is not beneficial to the accuracy or to the timeliness of the analysis, especially when comparing this to an analysis conducted directly within the system of records and based on live data. Accordingly, the systems and methods described herein provide multidimensional analyses that can be seamlessly integrated into the application environment. By switching to an analysis mode, the user can define dimensions and measures along which to analyze the data. Changes in the filter are immediately reflected between both views. Such analyses involve complex data models and powerful table controls that are already available in the FIORI analytical offerings. By transparently integrating these tools into a list report, for example, the FIORI environment can reuse a context that the user has created in both modes.

Figure 6C:
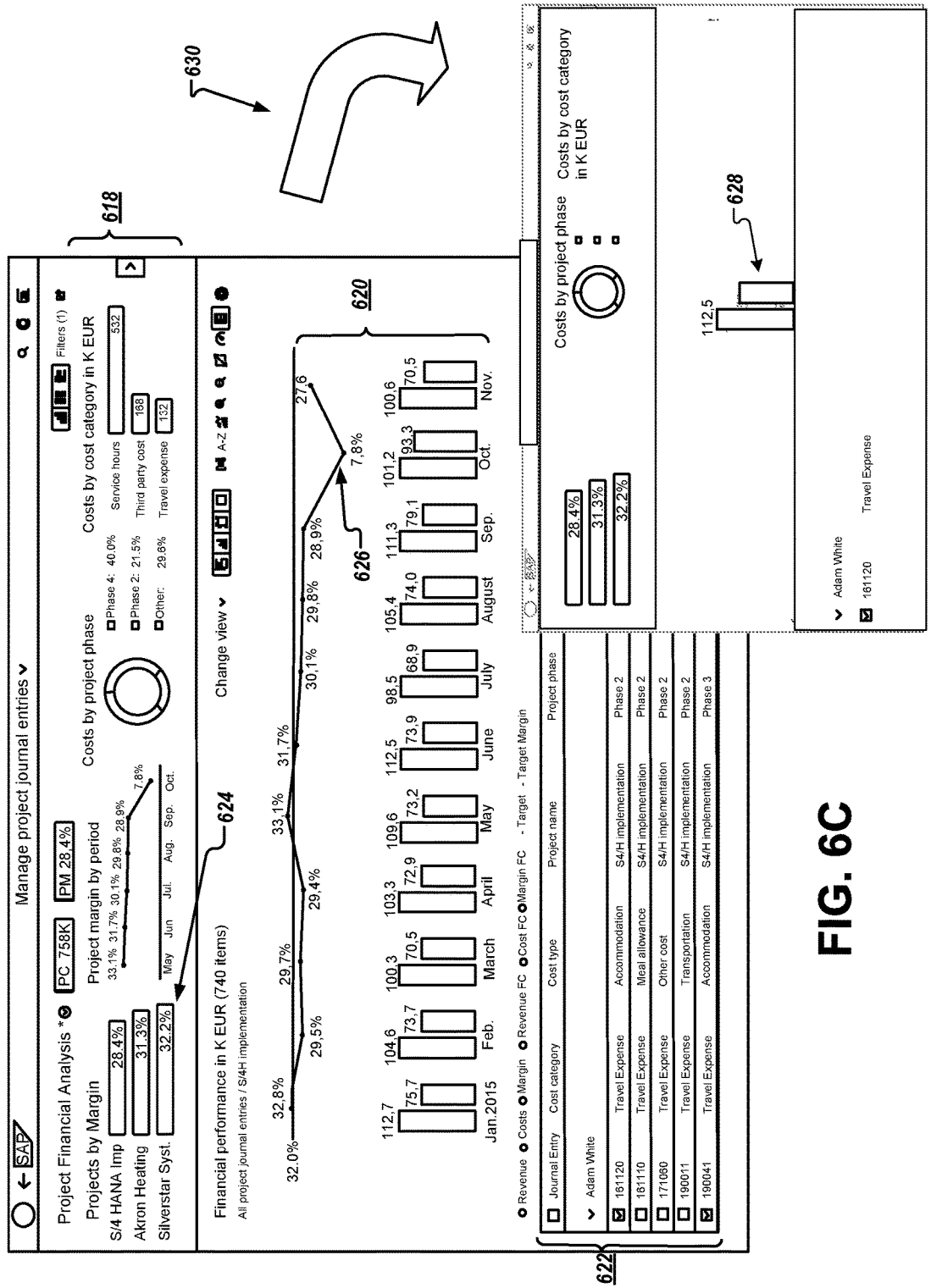

FIG. 6C is a screenshot depicting an example of components that can be shown on an analytical list page. Example visual filters are shown at area 618. In particular, filter values are shown for costs by cost category. Each filter can be interacted with in order to display an updated chart in area 620 and updated listing area 622, for example. The chart in area 620 may be interactive. For example, a user can select one or more data points and modify the data to view corresponding changes in other data lists, tables, objects, or charts associated with the data points. Area 622 corresponds to a number of calculations for transactional data at an item level. In this example, the user may select visual filters 624 that show the status of the dataset by calculating particular measures. A click inside the visual filter sets the filter value. For example, the user may select a month at point 626 to view the month of October 628 filtered down, as indicated by arrow 630. In operation, selecting inside the visual filter at point 626 functioned to set a filter value for October.

Figure 6D:
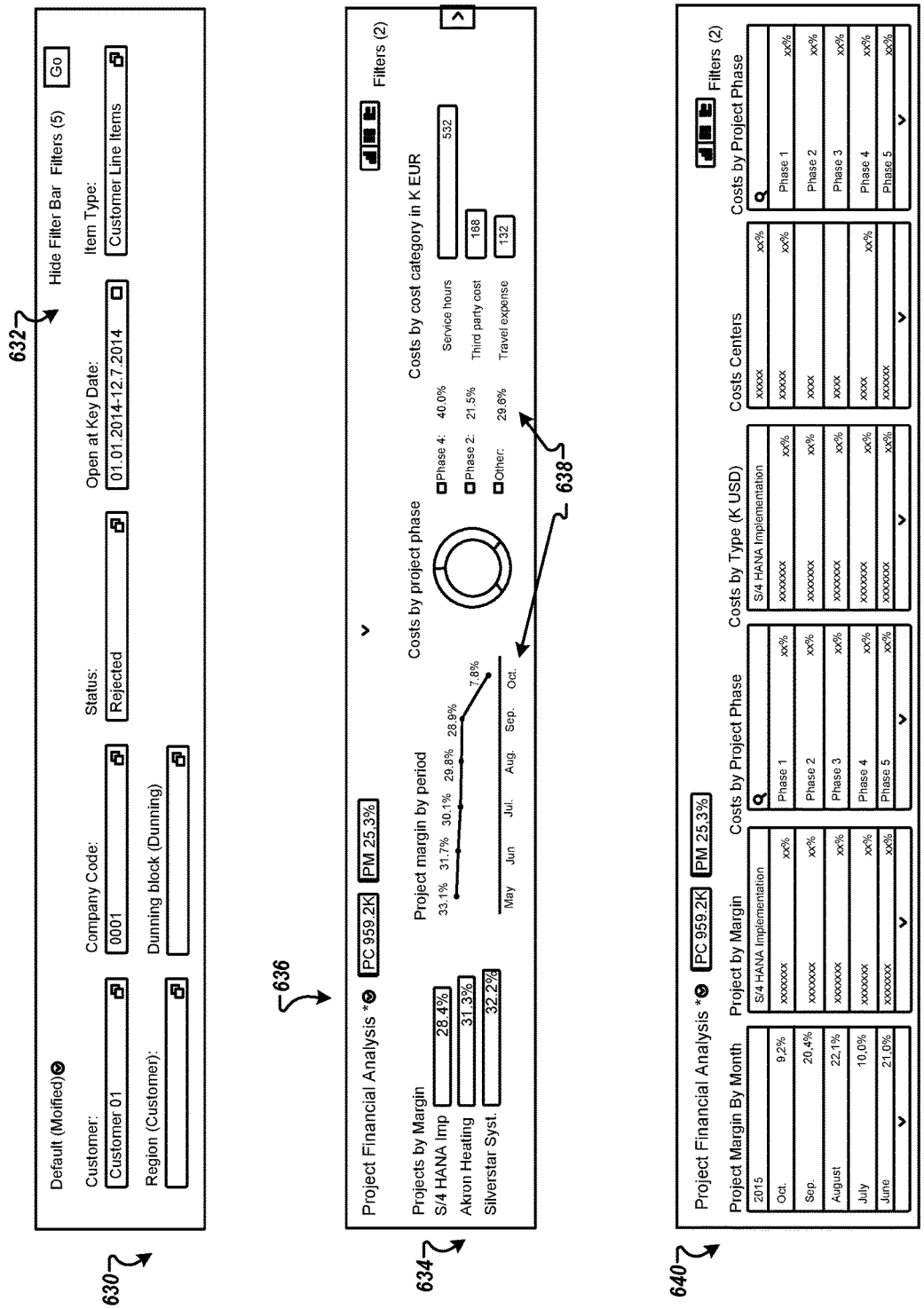

FIG. 6D is a screenshot depicting an example of various filter bar views. A compact mode filter bar view 630 shows a filter bar 632 and a number of dropdown selection boxes. A visual mode filter bar view 634 shows an efficient overview on data sets and one or more graphics 636 and selectable filters 638 within the graphics and data. A facet mode 640 includes a detailed view on a large amount of filter values. The display may be for multiple measures.

Figure 7A:
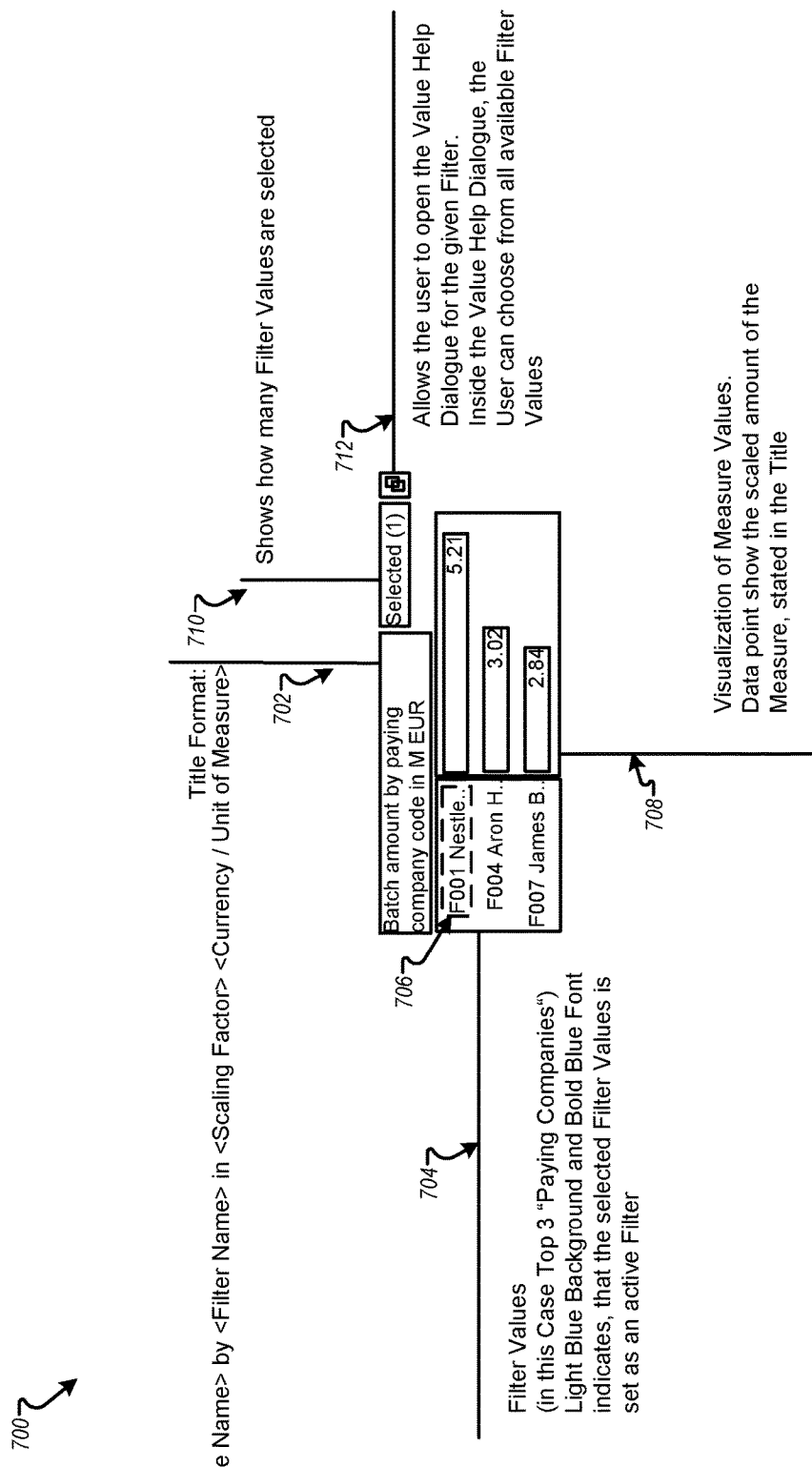
FIGS. 7A-7C are screenshots depicting example graphical filter elements.

As shown in FIG. 7A, a graphical filter 700 may be composed of various portions. For example, the graphical filter 700 may include a title 702 (e.g., batch amount by paying company code in M EUR). The title 702 may be of the format <Measure Name> by <Filter Name> in <Scaling Factor> <Currency/Unit of Measure>. The graphical filter 700 may also include filter values 704. Filter values 704 in this example include the top three paying companies. An active filter may be indicated, as shown by box 706. The graphical filter 700 may include a visualization of measure values 708. The visualization 708 may include any number of data points that show the scaled amount of a measure indicated by the title 702, for example. The graphical filter 700 may also include a selected filter value control 710 that indicates how many filter values are selected. The graphical filter 700 may also include a value help control 712 that allows the user to open and utilize value help dialogs for particular filters. Within the help dialogs, the user can choose from available filter values.

Figure 7B:
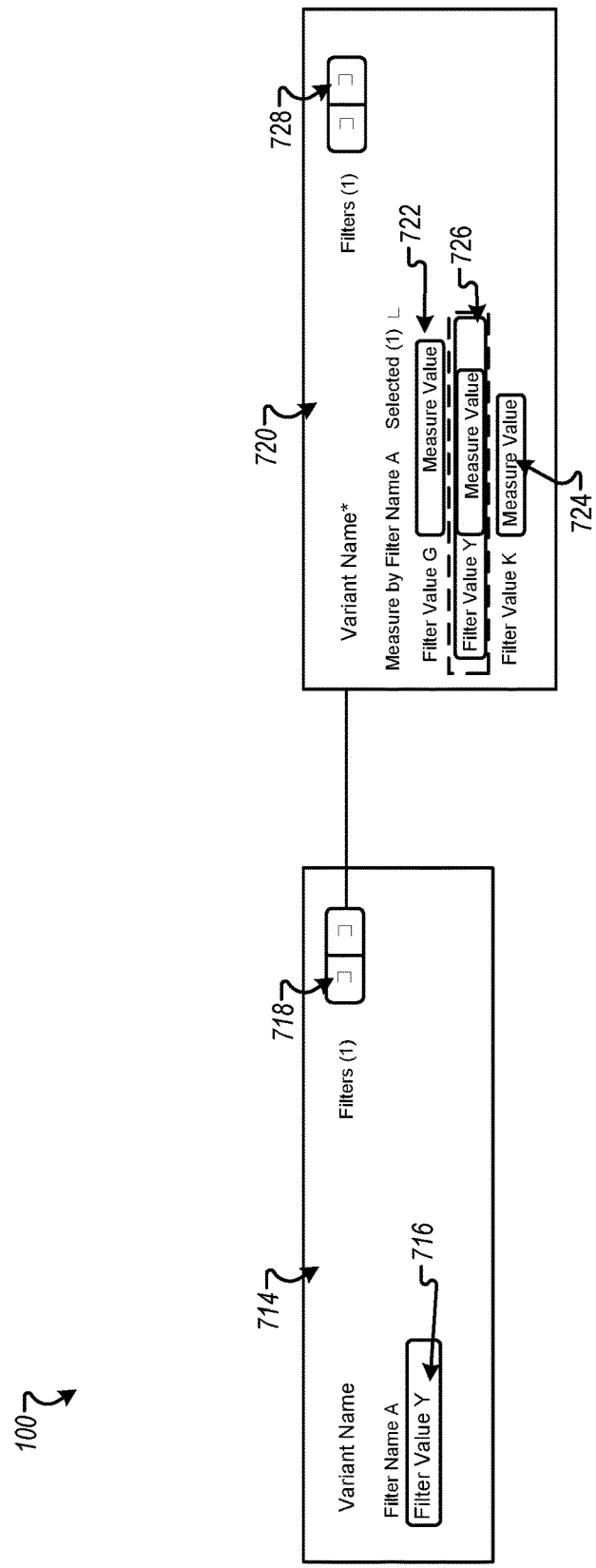

FIG. 7B illustrates an example of a compact filter and a normal filter for a VariantName element. In general, the filters shown here can be enhanced by measures and visualizations at the request of the user. The compact filter 714 includes a filter name 716 that can be selected and a filter control 718 to select additional filters. If the user selects control 718, an enhanced version of the VariantName element is shown at box 720. In this example, additional filter selections 722, 724 are provided. The user had selected filter value Y, as indicated by box 726. The user can toggle between the compact filter and the normal filter using control 728.

Figure 7C:
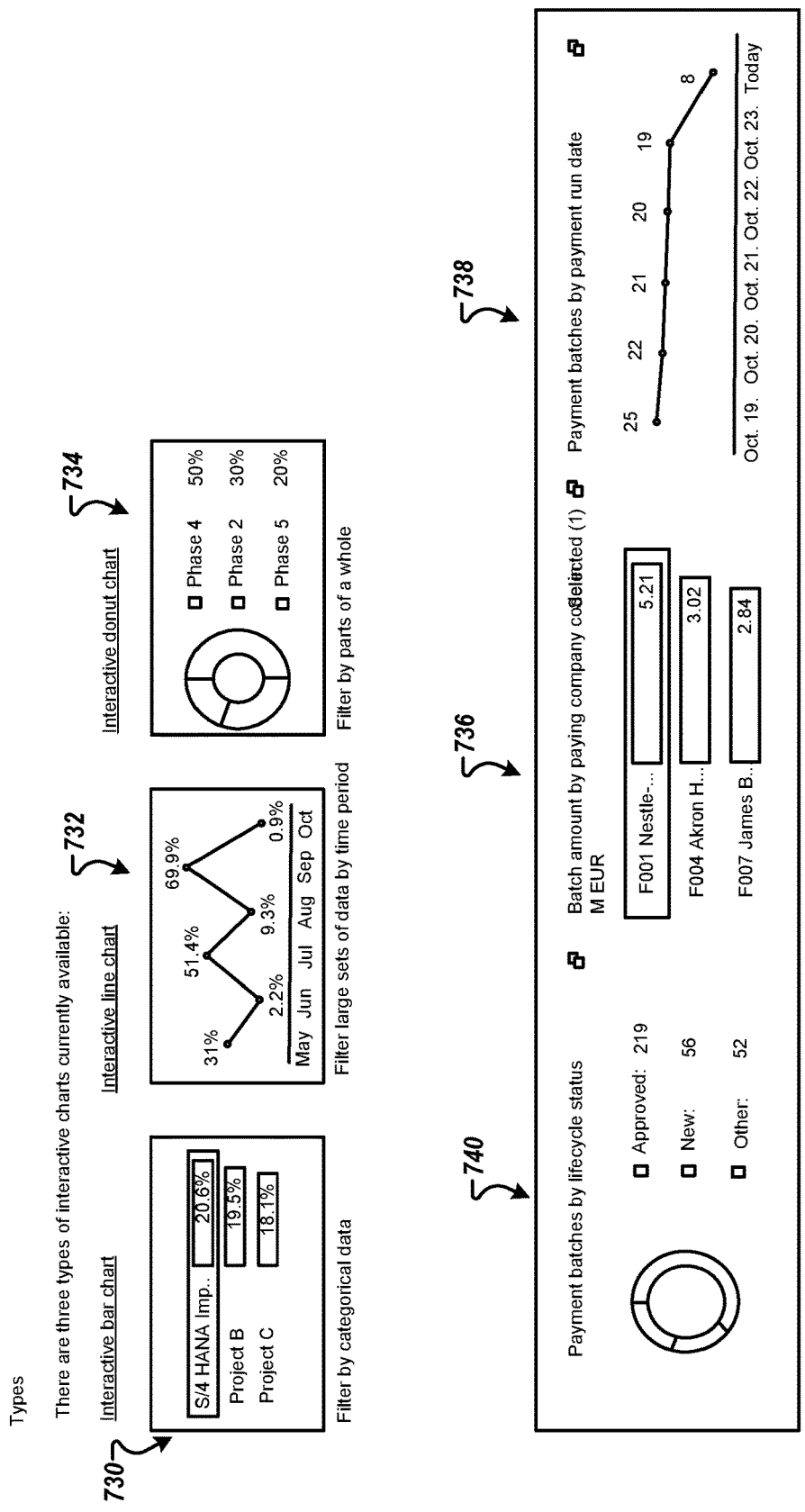

FIG. 7C illustrates three example types of interactive charts. Other charts and categories of charts are available for display, as described throughout this disclosure. The first example chart is an interactive bar chart 730. Chart 730 filters by categorical data. The second example chart is an interactive line chart 732. Chart 732 filters large data sets by time period. The third example chart is an interactive donut chart 734. Chart 734 filters by parts of a whole. An example bar chart 736 shows a filtered batch amount by paying customer metric. An example line chart 738 shows payment batches by payment run date. An example donut chart 740 shows payment batches by lifecycle status.

In general, charts are visually attractive and add value by making important information like relations, trends, deviations, and forecasts available at a glance. Charts typically show aggregated data, in order to keep the visual appearance simple. Charts are generated by services utilizing data sources, which are capable of aggregation (i.e. Analytical OData services).

As used herein, an analytical chart is a chart control, which leverages analytical extensions of the OData model (described above) by supporting out-of-the-box the following additional UX paradigms. A basic distinction of embedded analytics is the one between dimension and measures. Dimensions have a label, a key, and optionally, text and attributes. Measures have a label, a raw value, optionally a unit and optionally a formatted value. Based on this information, an analytical chart can significantly improve the default settings to show appropriate labels on legends and axes (e.g., showing texts instead of keys), and to display single values appropriately (e.g., currency code). This leads to a highly consistent, and enhanced user experience, and also to significantly less lines of code (JavaScript or XML) for the individual app developer.

The chart API can also offer convenient methods for the developer to express intents in terms of analytical semantics instead of simple properties. This further increases the development efficiency.

The chart may be used as a selector for single or multiple values because the systems described herein can rely on the filtering capabilities of the underlying data models. The single or multiple values may then be used as input for other parts of the application, (e.g. a detail chart). In this example, the user is interacting with and on the aggregated data. An analytical chart supports this usage type by offering different selection modes (e.g. single, multiple, categories, series), and by convenient programmatic access to the selected data points (in terms of dimension members and measure values).

An interactive drill down can be performed on a chart. Once the chart "knows" how to request aggregates, it can generically support the interaction patterns drill down, drill up and pivoting, because these directly translate into adding dimensions, removing dimensions and replacing dimensions in the data request. By identifying dimensions and measures with semantic objects, the identifications can be used to dynamically detect navigation targets, which potentially provide further (e.g. more detailed) related information.

The systems and methods described herein can provide an analytical chart which can be directly bound to an analytical OData service, and which brings a default implementation of many of the concepts described above to a degree that a web developer using the analytical chart only has to have very basic knowledge about analytics, to achieve a good result without a single line of his or her own controller logic.

In some implementations, the systems and methods described herein can also provide analytical tables. Analytical tables may be implemented using OData services in a similar fashion to analytical charts. In a standard SAP table, the UI5 OData model (e.g., FIGS. 3-5) is connected via a relative path to a backend OData service (potentially supporting the OData Query Options $select, $filter, $top, $skip, . . . ). The table control is bound to this model. The rows (an aggregation of the table) can be bound to a specific entityset of the OData model via the bindRows, accepting a path, a filter, and a select property list. Upon binding of the rows, a specific binding object is instantiated, which negotiates data requests between the table control and the OData model. For example, upon paging the table will ask the binding for the next N rows, and the Binding will ask the OData model send an appropriate OData request. This happens behind the scenes. The Binding may support all standard interactions on the table (sorting, filtering, etc.)

In doing so this triple ODataModel/Binding/Table enables all standard UI interactions on the table w/o additional controller code requested by the app developer. The basic coding sequence looks as simple as: (pseudo JavaScript code) oModel=new model (service: sUrl) oTable=new table oTable.setModel(oModel) oTable.bindRows( path: sPath, select: [. . . ], filter: oFilter)

In case of the Analytical table it is assumed, that the OData service is at least one analytical OData service. (Such services are generically exposed by application platforms with analytical capabilities, such as HANA XS, BW, and S/4HANA.) This implies that specific metadata annotations are available, and that the service supports data aggregation, mainly communicated via the $select query option.

The analytical OData model is an extension of the regular OData model, which offers convenient client-side access to these enhanced semantics (dimensions (label, key property, text property, attribute properties) and measures (label, raw value property, unit property, formatted value property).

Based on these extended metadata and runtime features, the table control offers an extended interaction model, featuring especially grouping and totals, and also implicit aggregation over dimensions which are currently not used in any table column. The analytical table is an extension of the standard table control.

In some implementations, the analytical chart can be combined with the analytical table. The charts run on the same metadata as the table, issues the same OData requests for the same intents as the table, and reads the data only once, if it has already been read for the table. In operation, the table typically offers grouping and aggregating of data, hierarchy display, and standard support for sorting, filtering, paging, and updating data. The chart typically offers many different chart types (line, column, pie, etc.) to provide an interactive graphical display.

The user can transition from chart to table views while interacting with an application. The transition from a chart displaying aggregated data graphically to a tabular display of the same data can be performed upon determining the aggregation level used in the chart display. This aggregation level includes the dimensions that make up the level of detail shown in the chart. As a result of drill down operations in the chart, some dimensions may have been filtered to some concrete members, and at least one dimension is included in the chart, often on the x-axis defining the categories, and possibly another dimension defining different series. The sequence of all these dimensions defines the aggregation level that is used to configure the analytical table. The filtered dimensions translate into a series of expanded groups at the respective levels up to the levels with the dimensions for the chart categories and optionally for the series. These two last deepest levels may be expanded in order to show the same level of detail as the chart.

The opposite transition from a tabular display in the analytical table to an analytical chart is not deterministic and employs one or more rules to be defined, because the user may expand more than one path of nested groups at the same time. Typically, one of these paths can be visualized in the chart display. A rule may be to consider the focused row in the table and select the path of nested groups down to the selected row.

In general, a number of components are used to support transitioning from chart to table or vice versa.

An analytical chart control may support particular data visualizations. The vizFrame chart library already provides the foundation for many of them. Every chart type has unique characteristics for rendering the data graphically. Therefore, for every chart type a dedicate set of rules define how to map the analytical semantics of the OData service elements to the different chart elements. Further rules are defined for how the analytical interactions are offered.

The mapping of analytical OData services to elements in an analytical chart can be explained with some concrete graphical charts. A service containing an entity set with two dimensions customer and year and a revenue measure can be mapped onto a line chart by picking the first of the two available dimensions:

In order to achieve this, the analytical chart introspects the metadata of the OData service and the analytical annotations contained therein. UI annotations may specify how measures and dimensions are assigned to the axes. Other annotations and/or rules for specific chart types determine further display options: dimension members are shown as key and/or text, measure are shown w/ unit/currency. A chart can also include more than one dimension. Charts may include specific elements allowing users to select a focus including, but not limited to a single value: a measure value for a set of members of all dimensions included in the chart; a series: a set of related values tied together by a member of a dimension (Customer 1, 2, 3) that defines the set of all series (Customer); a category: defined by another dimension (Year) whose members are the different category values (2010, 2011, . . . ) for every series. More dimensions can be visualized with a drill down interaction.

A chart visualizes the data entity set with a certain aggregation level defined by the set of dimensions included in the display. Users can interact with elements of the analytical chart to change the displayed aggregation level.

The drill down operation refines the aggregation level to show data in more detail. Without any focus selection, the user selects a free dimension not yet shown in the chart that is then added to the display and a second dimension can be added by switching from flat categories to nested categories. Similarly, if supported by the chart type, the user can select a free dimension that shall be used for defining series. This way, data is shown more detailed for every existing combination of category and series. Given some selected focus, the selected dimension member(s) are added to the filter expression that is applied on every OData request. Next, the user selects a free dimension that may yet be shown in the chart. That dimension can then replace the dimension(s) included in the selected focus.

Drill up is the opposite operation. Drill up may coarsen the aggregation level to show data on a higher aggregated level. The knowledge about the taken path of drilled down dimensions is assumed to be maintained outside of the Analytical Chart control, e.g., in a surrounding UI control combining the chart control with a kind of breadcrumb control that maintains the sequence of selected dimensions.

In general, a chart outline identifies dimension and measure properties, associated text, unit, and currency properties and analytical semantics of service elements. The series are created by one or more dimensions. The Analytical Binding configuration of the aggregated result shape starts with grouped columns for all these dimensions. Categories may be further grouped by columns that are added to the Analytical Binding configuration of the aggregated result shape for all dimensions that make up the category hierarchy. A single value may indicate all measures delivering the values shown in the chart may be added as aggregated columns to the Analytical Binding configuration of the aggregated result shape. The aggregated data result will then contain measure values for all existing combinations of dimension values shown in the category hierarchy and series.

Chart interactions may include drill down, drill up, and pivoting. Drill down can be achieved by re-shaping the aggregated result, e.g., by sub-dividing the categories into sub-categories. For this purpose, the detail dimension property is added as new last column to the binding configuration and the aggregated result is requested auto-expanded for the two visible dimensions. In some implementations, adding a filter condition for the selected category and then replacing the current dimension property used for the categories by another, yet free dimension can provide another drill down display. Drill up can be achieved by removing the corresponding dimension property from the aggregation level in the Analytical Binding configuration. Pivoting can be achieved by removing the dimension property to be replaced from the aggregation level configuration and then adding the other dimension property to it.

Figure 8A:
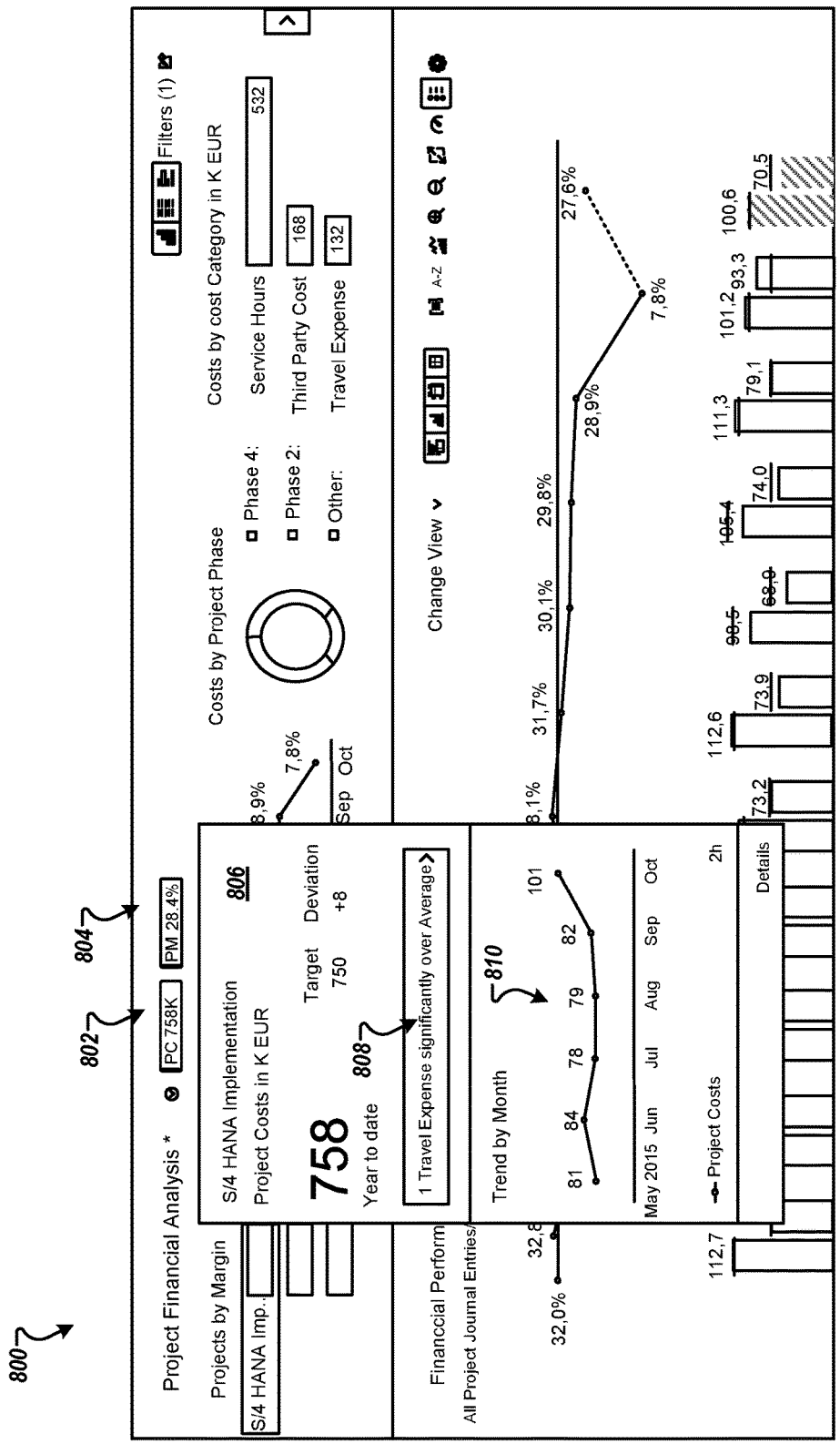
FIGS. 8A-8B are screenshots depicting example key performance indicator metrics.

FIG. 8A is a screenshot depicting example key performance indicator (KPI) metrics. Here, two KPI tags 802 and 804 are displayed in the title area. The two KPI tags 802 and 804 display global figures that guide the work of the user during the analysis process. By selecting tag 802, additional details are revealed in a popover 806. For example, additional details include a number of selectable filters at filter control 808 and graphical content 810 associated with a user selected filter.

Figure 8B:
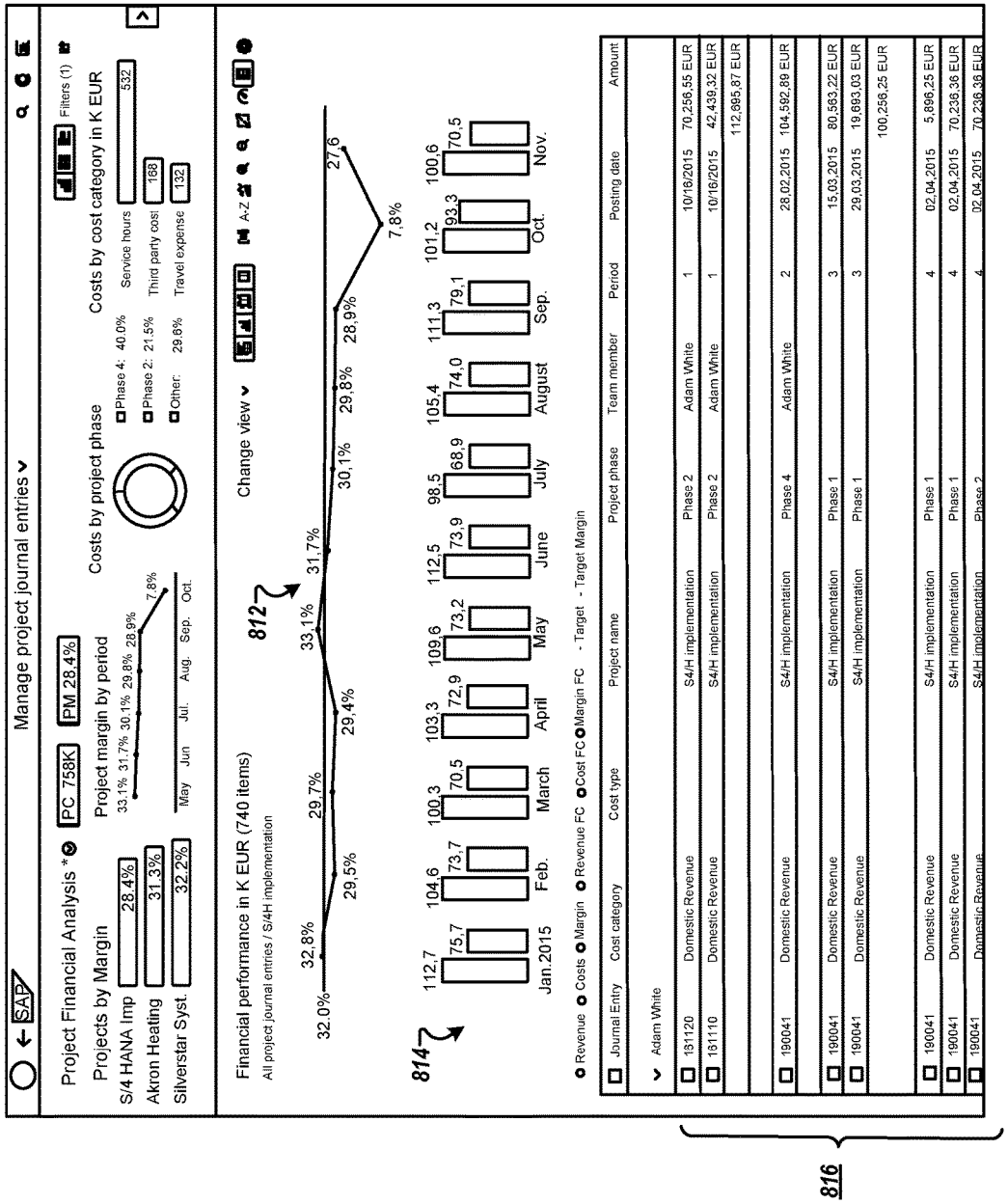

While working with large data sets, users often need to keep track of key figures that represent target values or thresholds for which their work is optimized. The systems and methods described herein define representations of KPIs in various sizes for use in different contexts. Sizes may range from an ultra-compact tag to a full page representation of a KPI. All these representations are connected, allowing the user to explore a KPI step by step by navigating from compact to more detailed representations, as shown in FIG. 8B at elements 812, 814, and 816.

In the case of the list report, global KPIs can be placed as tags in the title bar. Clicking or tapping a tag opens a popover which reveals additional details pertaining to the KPI, such as thresholds, extreme values, and timelines. Selecting Details allows the user to navigate into a full screen representation of the KPI.

The concept of progressively disclosing all levels of detail for a KPI can also be applied to other use cases. The benefit is that it allows a reduction in the usage of permanent space on the UI without having to discard information that a user might eventually need at a later point.

KPIs may be represented by a tag to a full page of content. Statistical analyses can be executed upon KPI information and learning algorithms may be used to identify exceptional patterns and outliers in the data. Such information may be provided to a user to indicate an action to be carried out by the user.

In general, KPIs represent numerical indicators based on transactional data to evaluate or measure the status and success of activities and situations. KPIs can be distinguished from simple measures/sums by their semantic coloring, which is based on thresholds. KPIs can be represented in very small form factors, but the user is able to find out more information by clicking on the KPI representation. KPIs are used to measure and monitor companies' performance on a strategic and operational level. KPI tags (e.g., Size XXXS) are very condensed views on KPIs. Their small size allows it to place them in every context. KPI Tags typically provide a glimpse at the status of the KPI and serve as an interactive Area to open a KPI Quickview (Size M) to reveal more information.

Figure 9B:
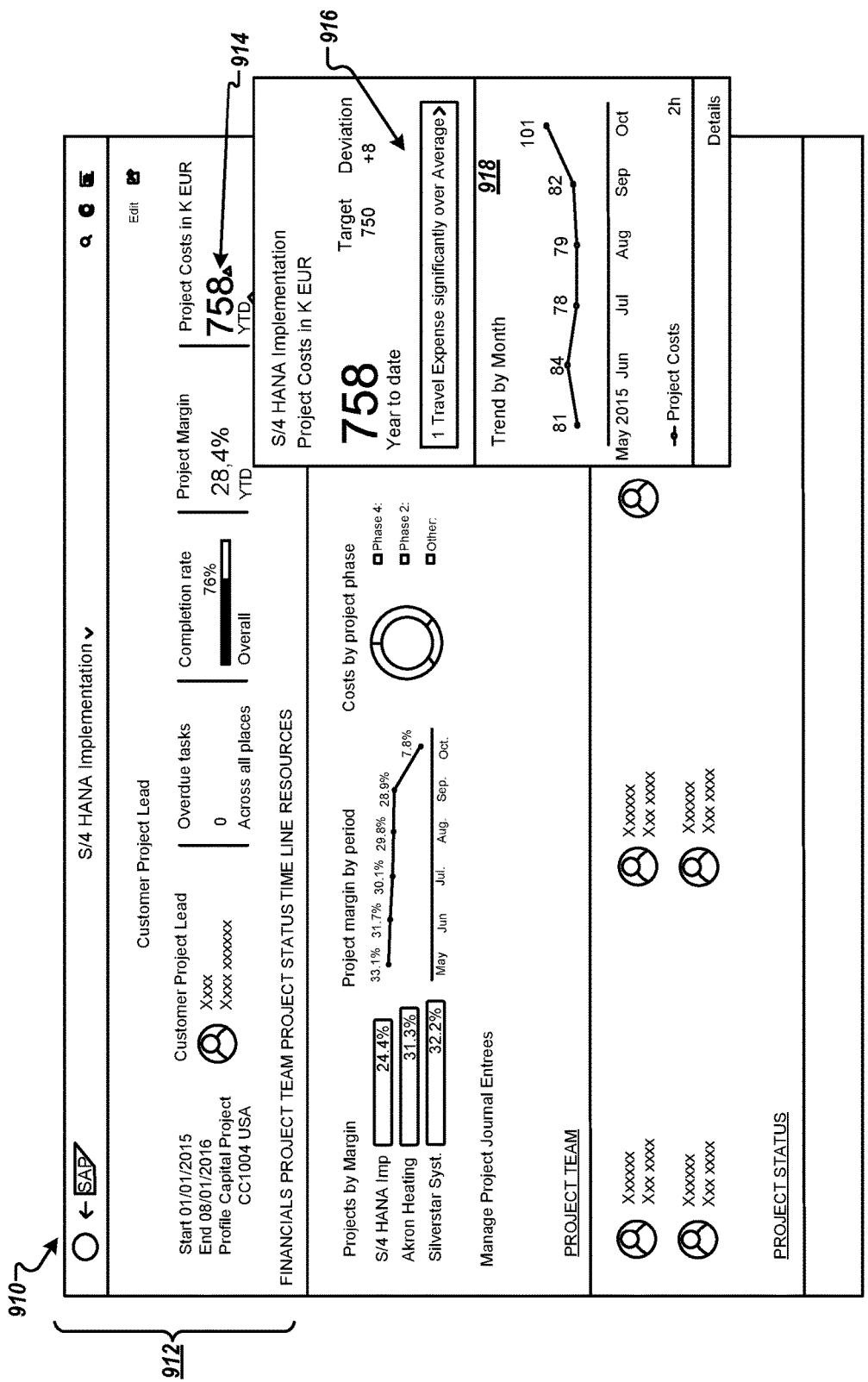
Figure 9C:
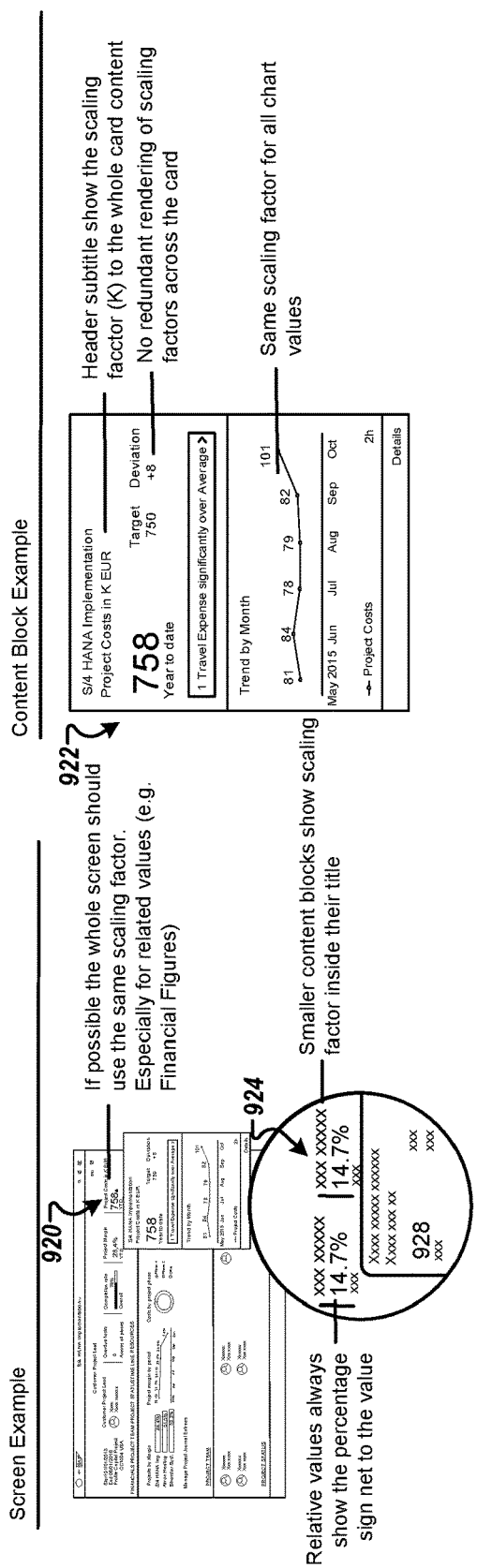

FIG. 9 is an example of an object page 900 used to generate data visualization content. The object page 900 may represent a standard floorplan to create, edit, and display detailed information about an object. This floorplan comes in different variants and configurations, which allow presentation of different types of content in an efficient way.

The object page header 902 offers full flexibility and richness, while also offering ways to hide the header information when the focus is on a content area 904. The object page header 902 makes use of the dynamic page layout, which uses a snapping behavior that collapses when scrolling.

The object page content area 904 follows two basic content structures: a) anchor-scrolling on a long flat page, with various short sections offering a perfect overview of all aspects of an object and b) tabbed with several independent subpages that can be switched using a tab strip, which accommodates long and complex content sections such as tables.

With the embedded analytics the object page 900 may be improved upon. For example, the object page 900 may include one or more header KPIs. The purpose of the object page header is to expose important information about an object. Often, this header area 902 serves as the initial check before the user digs deeper into the content of the object to obtain more details or to take action. Therefore, the header content 906 may remain limited in terms of its complexity and richness.

On the other hand, we know that KPIs as such are of limited value if the user is not also able to explore additional details such as trends or the development of a KPI over time. Ultimately, it should be possible for the user to jump off into a detailed analysis of a KPI when needed to identify the key influences and reasons for the current status.

FIG. 9B is an example of an object page 910 that includes KPIs in a header. In general, KPIs can be embedded into the object page header 912. When selecting the KPI 914, a popover 916 is triggered where the user can see more details about the KPI and can adjust some aspects as well as jump off into a detailed analysis.

The KPI 914 in the object page header 910 to be expanded using a popover that contains additional details about that KPI, as well as some controls 918 to adjust the KPI within this object. In addition, the KPI 914 can also be launched by a corresponding analytical application by selecting the KPI 914.

Multiple KPIs in an object page header can be accessed in popovers or full page views. In general, such KPI attributes may include target value and deviation metrics in addition to a single time-based visualization. In some implementations, proactive hints for exceptions and statistical outliers in the data set may be provided.

In some implementations, a visual filter may be used as a content aggregator. For example, the object page may include unified KPI visualizations and a visual filter bar as an interactive aggregated preview of the related data set.

As the object page typically consists of one long-scrolling page with different content sections that provide an easy overview of all aspects of an object, it is essential to keep the individual content sections short. If the sections become too long, the page will grow to be too large and the user will lose his or her orientation.

Instead of embedding large tables of related items, two example alternatives may be implemented: embedding an extract of the table into the page, or finding another way to aggregate the information.

Embedding an extract of the table works if there is a priority in the related data set so that the most relevant items can be displayed in the shortened version of the table. If all items in the table are equally important, there is no way to find a relevant set of items to display.

Alternatively, an aggregation of the related data set can help to summarize the data and reveal its most important aspects. For this end, the same filter bar used to summarize and filter the table content can also be used to display a summary of the report embedded into the object page. What's more, offering the same interactive filtering behavior can help the user explore the content even further. At any time, the user can navigate to the full report for details and take action.

In short, embedding interactive analytical visualizations into the object page can enable compression of the information and make a complex data set easy to consume. In addition, embedded interactive analytical visualizations can be scaled according to a particular method of display. For example, if a header depicts the visualizations, the content blocks within the header can scale according to their title, as shown by screen example 920. If the visualizations are to be shown in a content block, the header subtitle may be used to scale the content on the block, as shown by content block 922. Smaller content blocks may show a scaling factor inside a title. Each chart within either type of display may scale graphics with the same scaling factor.

Figure 10:
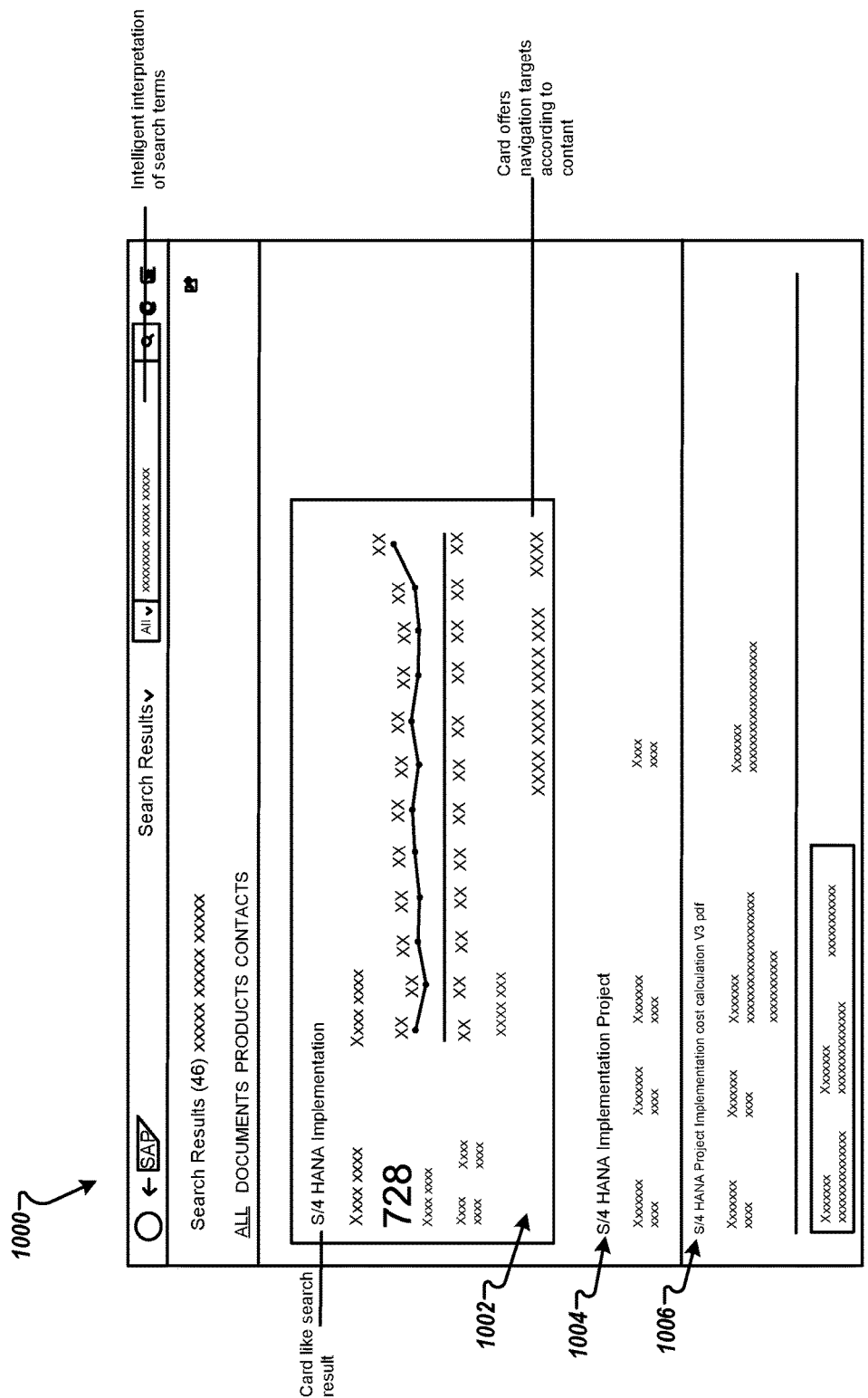
FIG. 10 is a screenshot of an example display providing embedded analytics within search results.

FIG. 10 is a screenshot 1000 of an example display providing embedded analytics within search results 1002, 1004, and 1006. From an end user perspective, there is often no strict separation between analytics and search. For example, the larger the result set of a list report gets, the more suitable it will be to go for a free-style filter instead of filters on specific columns. As such, there may be a seamless transition from an analytical list report to a search result list on the same data.

Even more obvious is the value of searching in analytical metadata in order to find analytical content relevant in the context of a specific application dynamically. The complete list of accessible analytics for a specific user will grow over time. Therefore the search capability of a context-sensitive relevancy ranking is important to keep the user experience at a high level.

In some implementations, embedded analytics can be provided proactively to assess problems within data to bring forth root causes and exceptions that tend to be hidden in highly condensed data elements. Such root cause information can be brought to the attention of a user without requesting a full detailed analysis.

Figure 11:
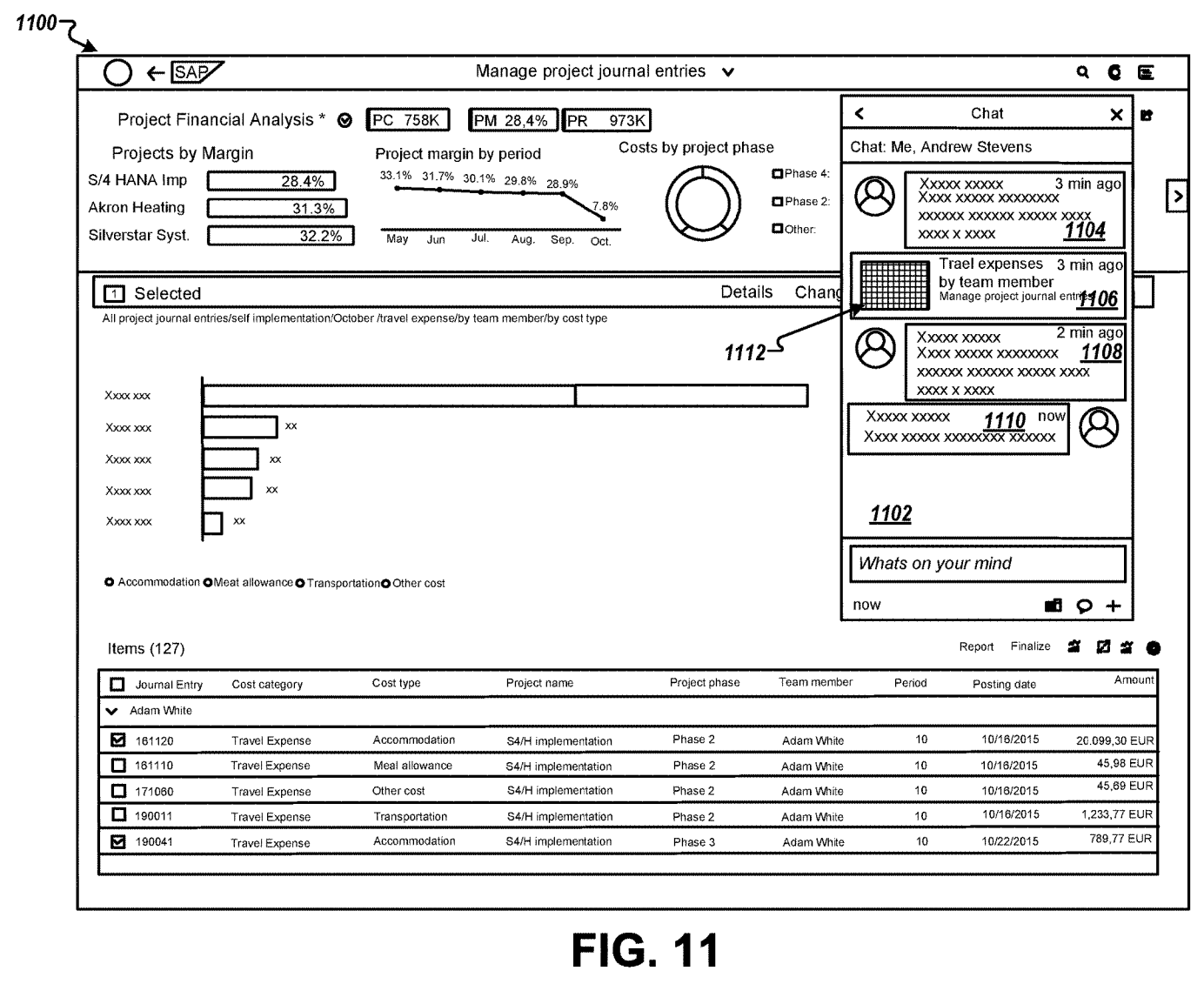

FIG. 11 is a screenshot 1100 depicting example embedded analytics within a messaging application. Notification 1102 is a chat program running with in a project application. The notification 1102 includes a number of notifications 1104, 1106, 1108 and 1110 in which the user has been a part of. Analytics 1112 have been inserted within the notification 1106. The analytics 1112 includes a travel expense report for a particular employee. The user may select upon the report 1112 to drill down into additional information stored within the analytics. The user may also edit, modify, copy, forward, or otherwise interact with the report 1112.

The report 1112 is an example of embedded analytics in which condensed KPI information (e.g., charts, project notes, and graphical content) is collapsed within a notification. In one example, the user selects the notification to expand additional information.

Figure 12:
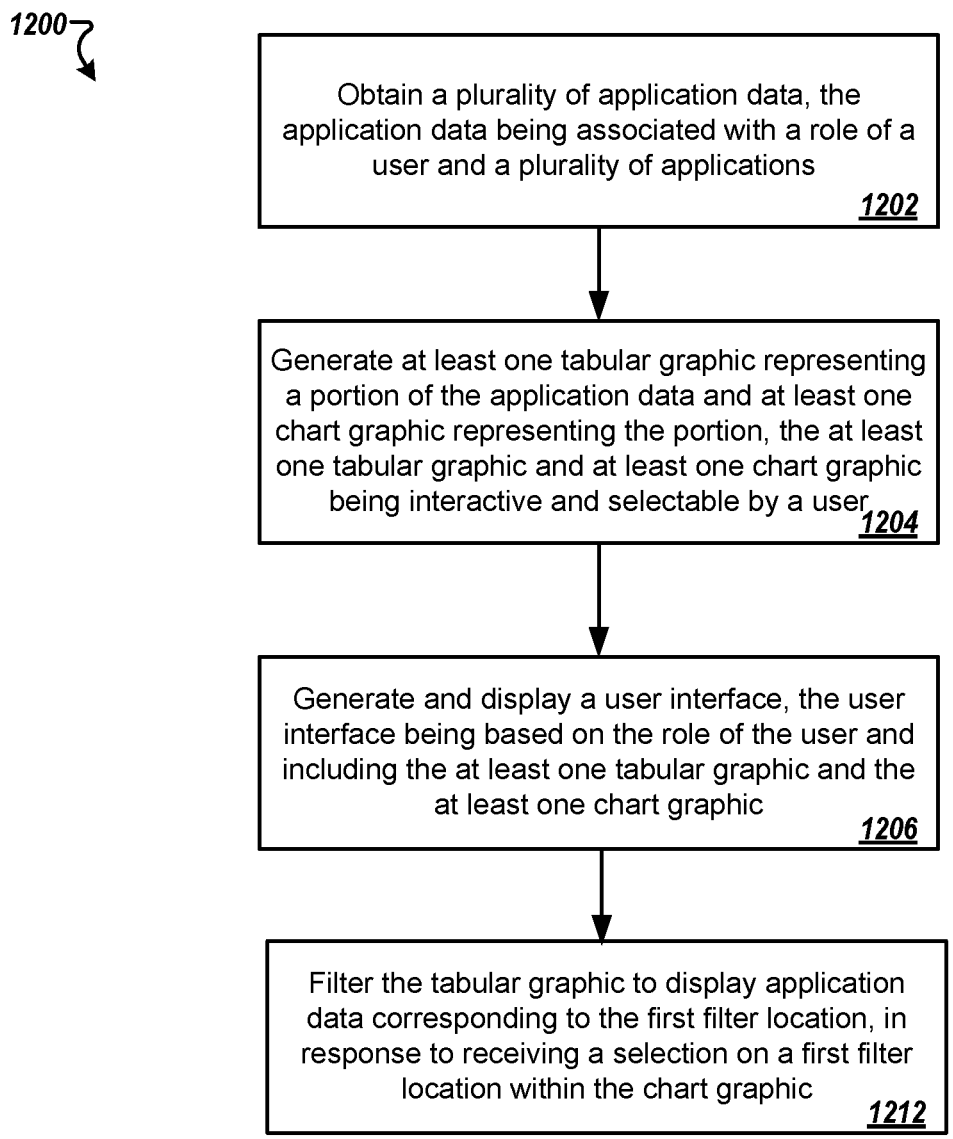
FIG. 12 is a flowchart that illustrates a process of generating embedded analytics.

FIG. 12 is a flowchart that illustrates a process 1200 for generating interactive graphics. The process 1200 can be carried out by the elements shown in FIGS. 2-5. The method 1200 may generate such interactive graphics using any number of data sources. For example, data sources may include any and all of the database 212, which represents an in-memory, column-oriented, relational database (e.g., SAP HANA®). The database management computing system 212 can include extended application services 240 that can embed a full featured application server, web server, and development environment within the database management computing system 212. The extended application services 240 can include application content 242 and reuse content 244 for use by the enterprise computing system 202 when providing a personalized, responsive, and simple UX across different types of computing devices and deployment options.

At block 1202, the process 1200 may include using at least one processor, to obtain a plurality of application data. The application data may be associated with a role of a user. For example, the application data may be data that the user access as part of a job function and as such, can be associated with a job role (e.g., within a company). In some implementations, the application data may be associated with a plurality of applications for example, the application data may be used to populate and execute any number of on premise, cloud-based, or standalone applications together or separately packaged.

In some implementations, the at least one processor may utilize at least one service that represents an open protocol data service (OData service) that accesses a plurality of data models and corresponding metadata to provide access to the user interface. In general, the open protocol data service defines a communication protocol for accessing the user interface.

At block 1204, the process 1200 may include generating at least one tabular graphic representing a portion of the application data. For example, a table of data may be generated for an application. One example of such a table is shown in FIG. 6A—bottom portion of 606. The table may represent a portion of the application data available. The process 1200 may additionally generate at least one chart graphic representing the portion of data. The chart graphic may be a pie chart, a bar graph, a line graph, a donut graph, or other graphical representation of data. Both of the at least one tabular graphic and at least one chart graphic being interactive and selectable by a user. For example, a user can interact with any of the tabular or chart graphics to modify, add, delete, or otherwise manipulate underlying data.

At block 1206, the process 1200 may include generating and displaying a user interface. The user interface may be based on the role of the user. For example, the user may be accessing an application and working on a process change order. The process change order may be generated based on an access level or job function associated with the user. The user interface can, in general, include the at least one tabular graphic and the at least one chart graphic. In addition, the user interface can include filtering controls, help controls, search controls, data organizing controls, etc.

At block 1208, the process 1200 may include, filtering the tabular graphic to display application data corresponding to the first filter location, in response to receiving, from the user, a selection on a first filter location within the chart graphic. For example, if the user wishes to narrow the focus on a portion of data, the user can select such data from a graphic (e.g., point 626 in FIG. 6C). The chart 620 can be filtered to show only aspects of selected point 626, as shown at graphic 628.

In general, the filtering removed data from the tabular graphic that does not correspond to the first filter location and modified the chart graphic to display a portion of the chart representing data corresponding to the selection on the first filter location.

In some implementations, the at least one chart graphic includes a plurality of selectable filter locations within the chart graphic. The selectable filter locations may be invisible to the user's eye, but may be arranged as selectable portions of the graphic. Receiving a selection on a second filter location may function to execute a filtering of the application data to update the user interface. The update may include generating additional interactive chart graphics, each representing different aspects of the portion of the application data. In some implementations, selecting one of the additional interactive chart graphics generates an update to each of the at least one chart graphic, the at least one tabular graphic, and the additional interactive chart graphics. For example, when one portion of a chart is modified, the corresponding data shown in other charts or tables is automatically updated accordingly.

In some implementations, the process 1200 also includes generating at least two key performance indicator (KPI) tags corresponding to the tabular graphic. The KPI tags may displayed in the user interface. Each key performance indicator tag represents a drill down of data associated with one or more of the chart graphics. The process 1200 can generate, using the portion of the plurality of application data, a chart graphic corresponding to each key performance indicator tag. This chart graphic can be inserted as a reduced size version of the particular corresponding graphic into each key performance indicator tag. The inserted chart graphics may be minimized upon a cursor being removed from a corresponding key performance indicator tag. The inserted chart graphics may be enlarged upon the cursor being placed upon a corresponding key performance indicator tag.

In some implementations, the process 1200 may combine the user interface, the additional interactive chart graphics, and the at least two key performance indicator tags into a webpage representing an analytical list page that is interactive and can present the analytical list page to the user, as shown in FIGS. 6A-6C.

In some implementations, embedding the at least one chart graphic in a messaging application includes inserting the at least one chart graphic into a message associated with the user, as shown in FIG. 11. In some implementations, the process 1200 may include embedding the at least one chart graphic into a tile on a homepage associated with the user.

While aspects of an embedded analytics may improve and/or augment a FIORI environment, such analytics are not limited to just a FIORI environment and may operate in any number of other environments such as for example standalone, in association with a system, etc.

Aspects of an embedded analytics may reside, operate, etc. within a user interface on any target device including for example any combination of one or more of a desktop, a notebook, a tablet, a smart phone, a smart watch, etc. and may among other things, dynamically adjust or adapt aspects of itself to account for any particulars (e.g., display real estate, input mechanism(s), etc.) of a target device.

A target device may be any combination of one or more of, among other things, a desktop computer, a notebook computer, a laptop computer, a tablet, a smartphone, a smartwatch, etc.

Aspects of an embedded analytics facility may take any number of forms including, for example, any combination of one or more of web-based, native, hybrid, containerized environment, etc.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of this disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for generating interactive graphics using at least one processor, the method comprising:
   obtaining a plurality of application data, the application data being associated with a role of a user and a plurality of applications;
   generating a tabular graphic representing a portion of the application data in a table representation structure and a chart graphic representing the portion in a graph representation form;
   generating and displaying a user interface including the tabular graphic and the chart graphic in an interactive and selectable mode; and
   receiving a selection of a first selectable filter point within the chart graphic on the user interface, wherein the chart graphic represents a dimension and a measure of the portion of the application data, and wherein the first selectable filter point is associated with a dimension value of the dimension and a corresponding aggregated value for the measure;
   in response to the received selection, filtering the portion of the application data based on the dimension value and the measure associated with the first selectable filter point; and
   updating the tabular graphic to present the filtered portion of the application data in the table representation structure of the tabular graphic and displaying an updated chart graphic including a portion of the chart graphic representing data corresponding to the dimension value and the measure.

2. The method of claim 1, wherein the chart graphic includes a plurality of selectable filter points within the chart graphic, wherein the plurality of selectable filter points includes the first selectable filter point, and wherein the method further comprises:
   receiving a selection on a second filter point; and
   executing filtering of the application data to update the user interface, the update including generating additional interactive chart graphics, wherein a graphic from the additional interactive chart graphics represent different aspects of the portion of the application data.

3. The method of claim 2, wherein selecting one of the additional interactive chart graphics generates an update to the chart graphic, the tabular graphic, and the additional interactive chart graphics.

4. The method of claim 1, further comprising:
   generating at least two key performance indicator tags corresponding to the tabular graphic, wherein when a key performance indicator tag is selected a drill down of data associated with one or more additional interactive chart graphics is presented on the user interface;
   generating, using the portion of the plurality of application data, a chart graphic corresponding to the key performance indicator tag; and inserting the corresponding chart graphic in a reduced size within the key performance indicator tag, the inserted chart graphics being minimized upon a cursor being removed from the key performance indicator tag, and the inserted chart graphics being enlarged upon the cursor being placed upon the key performance indicator tag.

5. The method of claim 4, further comprising:
combining the user interface including the tabular graphic and the chart graphic, the additional interactive chart graphics, and the at least two key performance indicator tags into a webpage representing an analytical list page that is interactive; and
presenting the analytical list page to the user in a selection mode.

6. The method of claim 1, wherein the at least one processor utilizes at least one service that represents an open protocol data service that accesses a plurality of data models and corresponding metadata to provide access to the user interface, wherein the open protocol data service defines a communication protocol for accessing the user interface.

7. The method of claim 1, further comprising embedding the chart graphic in a messaging application by inserting the chart graphic into a message associated with the user.

8. The method of claim 1, further comprising embedding the chart graphic into a tile on a homepage associated with the user.

9. A system for generating embedded analytic data, the system comprising:
at least one memory including instructions on a computing device; and
at least one processor on the computing device, wherein the processor is operably coupled to the at least one memory and is arranged and configured to execute the instructions that, when executed, cause the processor to implement an analytic generation engine, wherein the analytic generation engine is configured to,
obtain a plurality of application data, the application data being associated with a role of a user and a plurality of applications;
generate a tabular graphic representing a portion of the application data in a table representation structure and a chart graphic representing the portion in a graph representation form;
generate and display a user interface including the tabular graphic and the chart graphic in an interactive and selectable mode; and
receive a selection of a first selectable filter point within the chart graphic on the user interface, wherein the chart graphic represents a dimension and a measure of the portion of the application data, and wherein the first selectable filter point is associated with a dimension value of the dimension and a corresponding aggregated value for the measure;
in response to the received selection, filter the portion of the application data based on the dimension value and the measure associated with the first selectable filter point; and
update the tabular graphic to present the filtered portion of the application data in the table representation structure of the tabular graphic and display an updated chart graphic including a portion of the chart graphic representing data corresponding to the dimension value and the measure.

10. The system of claim 9, wherein the chart graphic includes a plurality of selectable filter points within the chart graphic, wherein the plurality of selectable filter points includes the first selectable filter point, and wherein the analytic generation engine is further configured to:
receive a selection on a second filter point; and
execute filtering of the application data to update the user interface, the update including generating additional interactive chart graphics, wherein a graphic from the additional interactive chart graphics represent different aspects of the portion of the application data.

11. The system of claim 10, wherein selecting one of the additional interactive chart graphics generates an update to the chart graphic, the tabular graphic, and the additional interactive chart graphics.

12. The system of claim 9, wherein the analytic generation engine is further configured to,
generate at least two key performance indicator tags corresponding to the tabular graphic, wherein when a key performance indicator tag is selected a drill down of data associated with one or more additional interactive chart graphics is presented on the user interface;
generate, using the portion of the plurality of application data, a chart graphic corresponding to the key performance indicator tag; and
insert the corresponding chart graphic in a reduced size within the key performance indicator tag, the inserted chart graphics being minimized upon a cursor being removed from the key performance indicator tag, and the inserted chart graphics being enlarged upon the cursor being placed upon the key performance indicator tag.

13. The system of claim 12, wherein the analytic generation engine is further configured to:
combine the user interface including the tabular graphic and the chart graphic, the additional interactive chart graphics, and the at least two key performance indicator tags into a webpage representing an analytical list page that is interactive; and
present the analytical list page to the user in a selection mode.

14. The system of claim 9, wherein the at least one processor utilizes at least one service that represents an open protocol data service that accesses a plurality of data models and corresponding metadata to provide access to the user interface, wherein the open protocol data service defines a communication protocol for accessing the user interface.

15. The system of claim 9, wherein the analytic generation engine is further configured to embed the chart graphic into a tile on a homepage associated with the user.

16. A computer program product being tangibly embodied on a non-transitory computer-readable storage medium and comprising instructions that, when executed by at least one computing device, are configured to cause the at least one computing device to:
obtain a plurality of application data, the application data being associated with a role of a user and a plurality of applications;
generate a tabular graphic representing a portion of the application data in a table representation structure and a chart graphic representing the portion in a graph representation form;
generate and display a user interface including the tabular graphic and the chart graphic in an interactive and selectable mode; and
receive a selection of a first selectable filter point within the chart graphic on the user interface, wherein the chart graphic represents a dimension and a measure of the portion of the application data, and wherein the first selectable filter point is associated with a dimension value of the dimension and a corresponding aggregated value for the measure;

in response to the received selection, filter the portion of the application data based on the dimension value and the measure associated with the first selectable filter point; and update the tabular graphic to present the filtered portion of the application data in the table representation structure of the tabular graphic and display an updated chart graphic including a portion of the chart graphic representing data corresponding to the dimension value and the measure.

17. The computer program product of claim 16, wherein the chart graphic includes a plurality of selectable filter points within the chart graphic, wherein the plurality of selectable filter points includes the first selectable filter point, and wherein the computer program product further comprises instructions to:

receive a selection on a second filter point; and execute filtering of the application data to update the user interface, the update including generating additional interactive chart graphics, wherein a graphic from the additional interactive chart graphics represent different aspects of the portion of the application data.

18. The computer program product of claim 16, wherein the at least one computing device is further configured to:

generate at least two key performance indicator tags corresponding to the tabular graphic, wherein when a key performance indicator tag is selected a drill down of data associated with one or more additional interactive chart graphics is presented on the user interface;

generate, using the portion of the plurality of application data, a chart graphic corresponding to the key performance indicator tag; and insert the corresponding chart graphic in a reduced size within the key performance indicator tag, the inserted chart graphics being minimized upon a cursor being removed from the key performance indicator tag, and the inserted chart graphics being enlarged upon the cursor being placed upon the key performance indicator tag.

19. The computer program product of claim 16, wherein the at least one computing device is further configured to utilize at least one service that represents an open protocol data service that accesses a plurality of data models and corresponding metadata to provide access to the user interface, wherein the open protocol data service defines a communication protocol for accessing the user interface.

20. The computer program product of claim 16, wherein the at least one computing device is further configured to embed the chart graphic in a messaging application by inserting the chart graphic into a message associated with the user.

* * * * *